United States Patent
Kanaya

(10) Patent No.: US 9,222,541 B2
(45) Date of Patent: Dec. 29, 2015

(54) FLUID-FILLED VIBRATION DAMPING DEVICE

(71) Applicant: TOKAI RUBBER INDUSTRIES, LTD., Komaki-shi, Aichi (JP)

(72) Inventor: Tomohiro Kanaya, Kasugai (JP)

(73) Assignee: SUMITOMO RIKO COMPANY LIMITED, Aichi (JP)

( * ) Notice: Subject to any disclaimer, the term of this patent is extended or adjusted under 35 U.S.C. 154(b) by 0 days.

(21) Appl. No.: 14/335,153

(22) Filed: Jul. 18, 2014

(65) Prior Publication Data

US 2014/0327199 A1 Nov. 6, 2014

Related U.S. Application Data

(63) Continuation of application No. PCT/JP2013/003512, filed on Jun. 4, 2013.

(30) Foreign Application Priority Data

Jun. 12, 2012 (JP) .................................. 2012-132573
Jun. 12, 2012 (JP) .................................. 2012-132574

(51) Int. Cl.
*F16F 13/08* (2006.01)
*F16F 13/10* (2006.01)

(52) U.S. Cl.
CPC ................ *F16F 13/08* (2013.01); *F16F 13/10* (2013.01); *F16F 13/106* (2013.01)

(58) Field of Classification Search
CPC ......... F16F 13/08; F16F 13/10; F16F 13/102; F16F 13/105; F16F 13/264; F16F 13/268
See application file for complete search history.

(56) References Cited

U.S. PATENT DOCUMENTS

| 4,657,232 A | 4/1987 | West |
| 4,997,169 A | 3/1991 | Nakamura et al. |

(Continued)

FOREIGN PATENT DOCUMENTS

| CN | 101311577 A | 11/2008 |
| JP | U-2-24142 | 2/1990 |

(Continued)

OTHER PUBLICATIONS

Aug. 5, 2014 International Preliminary Report on Patentability issued in International Application No. PCT/JP2012/005409.

(Continued)

*Primary Examiner* — Vishal Sahni
(74) *Attorney, Agent, or Firm* — Oliff PLC

(57) ABSTRACT

A fluid-filled vibration damping device including: first and second mounting members elastically connected by a main rubber elastic body; a partition member supported by the second mounting member; a pressure-receiving chamber and an equilibrium chamber disposed on either side of the partition member; a housing space formed within the partition member; a plate-shaped movable member arranged in the housing space with liquid pressures of the pressure-receiving chamber and the equilibrium chamber applied to the respective faces of the movable member; and a rubber buffer arranged on wall inner surfaces of the housing space to be struck by the movable member. The movable member is grasped partially in a thickness direction between the wall inner surfaces of the housing space via the rubber buffer at surfaces facing the wall inner surfaces of the housing space.

10 Claims, 12 Drawing Sheets

(56) References Cited

U.S. PATENT DOCUMENTS

| | | |
|---|---|---|
| 7,188,830 B2 | 3/2007 | Kato et al. |
| 8,490,954 B2 | 7/2013 | Saito et al. |
| 8,556,239 B2 | 10/2013 | Okumura et al. |
| 2003/0080482 A1 | 5/2003 | Desmoulins et al. |
| 2005/0206056 A1* | 9/2005 | Maeno et al. ............ 267/140.13 |
| 2005/0258581 A1 | 11/2005 | Tanaka |
| 2008/0290573 A1 | 11/2008 | Katayama et al. |
| 2014/0175719 A1* | 6/2014 | Kanaya ................... 267/140.13 |
| 2014/0232049 A1* | 8/2014 | Kanaya ................... 267/140.13 |

FOREIGN PATENT DOCUMENTS

| | | |
|---|---|---|
| JP | A-2003-184939 | 7/2003 |
| JP | A-2004-003656 | 1/2004 |
| JP | A-2006-112607 | 4/2006 |
| JP | A-2006-144982 | 6/2006 |
| JP | A-2006-144983 | 6/2006 |
| JP | A-2006-250281 | 9/2006 |
| JP | A-2007-271001 | 10/2007 |
| JP | A-2008-196630 | 8/2008 |
| JP | A-2008-291969 | 12/2008 |
| JP | A-2009-085313 | 4/2009 |
| JP | A-2009-085344 | 4/2009 |
| JP | A-2009-222192 | 10/2009 |
| JP | A-2009-243510 | 10/2009 |
| WO | WO 2008/069131 A1 | 6/2008 |

OTHER PUBLICATIONS

U.S. Appl. No. 14/259,799, filed Apr. 23, 2014 in the name of Kanaya.
International Search Report issued in International Application No. PCT/JP2012/005409 mailed Nov. 27, 2012.
International Search Report issued in International Application No. PCT/JP2012/004723 mailed Nov. 6, 2012 (with translation).
U.S. Appl. No. 14/142,516, filed Dec. 27, 2013 in the name of Kanaya.
International Search Report issued in International Application No. PCT/JP2013/003512 mailed Aug. 6, 2013 (with translation).
Jul. 1, 2014 International Preliminary Report on Patentability issued in International Application No. PCT/JP2012/004723.
Jul. 29, 2015 Office Action issued in U.S. Appl. No. 14/259,799.
Mar. 30, 2015 Office Action issued in Chinese Application No. 2012-80065671.5.

* cited by examiner

FLUID-FILLED VIBRATION DAMPING DEVICE

INCORPORATED BY REFERENCE

The disclosures of Japanese Patent Application Nos. 2012-132573 filed on Jun. 12, 2012 and 2012-132574 filed on Jun. 12, 2012, each including the specification, drawings and abstract is incorporated herein by reference in its entirety. This is a Continuation of International Application No. PCT/JP2013/003512 filed on Jun. 4, 2013.

BACKGROUND OF THE INVENTION

1. Field of the Invention

The present invention relates to a fluid-filled vibration damping device used for automobile engine mounts and the like.

2. Description of the Related Art

From the past, vibration damping devices have been known which are interposed between members constituting a vibration transmission system, and for which those members have a mutual vibration damping connection and vibration damping support, and as one type of vibration damping device, fluid-filled vibration damping devices are also known that exhibit a vibration damping effect based on the fluid flow action of the fluid sealed inside. This fluid-filled vibration damping device has a first mounting member and a second mounting member elastically connected by a main rubber elastic body, and on both sides of a partition member supported by the second mounting member are formed a pressure-receiving chamber and an equilibrium chamber, sealed in which is a non-compressible fluid. Furthermore, the pressure-receiving chamber and the equilibrium chamber are in communication with each other through an orifice passage, and the target vibration damping effect is exhibited based on the fluid flow action of the fluid that flows through the orifice passage. For example, that is what is shown in Japanese Unexamined Patent Publication No. JP-A-2009-243510.

However, with the fluid-filled vibration damping device, while the orifice passage effectively exhibits a vibration damping effect based on the fluid flow action of fluid on vibrations of a frequency at which the orifice passage is tuned, it is difficult to obtain an effective vibration damping effect on vibrations of a frequency outside the tuning frequency. In particular, when a vibration of a higher frequency than the tuning frequency is input, the orifice passage is substantially blocked by the anti-resonance, so there is the problem that the vibration damping performance by high action spring reaction decreases.

In light of that, with the structure noted in JP-A-2009-243510, a liquid pressure transmission mechanism is provided that is equipped with a fluid flow path that allows transmission of liquid pressure between the pressure-receiving chamber and the equilibrium chamber when vibration of a higher frequency than the tuning frequency of the orifice passage is input. In specific terms, this liquid pressure transmission mechanism has a structure by which a movable member (movable plate) is arranged held in a housing space formed on a partition member, and each of the liquid pressure of the pressure-receiving chamber and the liquid pressure of the equilibrium chamber is applied to both surfaces of the movable member through a communicating hole (fluid flow path) formed by piercing through a wall part of a housing space. Then, when inputting a high frequency, low amplitude vibration, the movable member has minute displacement or minute deformation, allowing transmission of liquid pressure between the pressure-receiving chamber and the equilibrium chamber, and when vibration of the orifice passage tuning frequency range is input, the movable member closes the communicating hole, preventing transmission of liquid pressure between the chambers. By so doing, it is possible to selectively and effectively obtain either the vibration damping effect exhibited by the flow action of the fluid that passed through the orifice passage, or the vibration damping effect exhibited by the liquid pressure absorption effect of the liquid pressure transmission mechanism.

However, with the fluid-filled vibration damping device equipped with this kind of liquid pressure transmission mechanism, when the movable member contacts the inner surface of the housing space, it is easy to have the problem of having a striking noise occur based on the impact force. Specifically, the impact energy when the movable member contacts the inner surface of the housing space is applied to a vehicle body via the partition member and the second mounting member that supports it, so there was the risk of noise occurring inside the passenger area.

SUMMARY OF THE INVENTION

The present invention was created with the circumstances described above as the background, and the problem it is to address is to provide a fluid-filled vibration damping device of a novel constitution for which it is possible to effectively reduce or prevent the occurrence of a striking noise that occurs due to contact of the movable member.

Specifically, the first mode of the present invention provides a fluid-filled vibration damping device including: a first mounting member; a second mounting member; a main rubber elastic body elastically connecting the first and second mounting members; a partition member supported by the second mounting member; a pressure-receiving chamber whose wall portion is partially defined by the main rubber elastic body and disposed on a first side of the partition member; an equilibrium chamber whose wall portion is partially defined by a flexible film and disposed on a second side of the partition member; an orifice passage through which the pressure-receiving chamber and the equilibrium chamber communicate with each other; a housing space formed within the partition member; a plate-shaped movable member arranged in the housing space with liquid pressure of the pressure-receiving chamber applied to a first face of the movable member and liquid pressure of the equilibrium chamber applied to a second face of the movable member; and a rubber buffer arranged on wall inner surfaces of the housing space to be struck by the movable member, wherein the movable member is grasped partially in a thickness direction between the wall inner surfaces of the housing space via the rubber buffer at surfaces facing the wall inner surfaces of the housing space.

With this kind of fluid-filled vibration damping device constituted according to the first mode, by the rubber buffer being arranged on and covering the wall inner surfaces of the housing space to be struck by the movable member, the impact force is reduced when the movable member contacts the wall inner surface of the housing space, and the striking noise due to that contact is reduced.

Furthermore, since the movable member is partially grasped in the thickness direction between the wall inner surfaces of the housing space, the deformation or displacement of the movable member is limited by the wall inner surface of the housing space. By so doing, when the movable member contacts the wall inner surface of the housing space, by the deformation volume or the displacement volume of the movable member being suppressed, the impact force during contact is reduced, and the occurrence of the striking noise due to contact is prevented.

In fact, since the movable member is grasped via the rubber buffer between the wall inner surfaces of the housing space, the movable member is elastically supported by the wall inner surfaces of the housing space, and deformation and displacement of the movable member is also allowed by elastic deformation of the rubber buffer. Because of that, it is possible to sufficiently reduce the striking noise, and to effectively realize the target vibration damping performance.

In addition, by preventing direct contact by the movable member on the wall inner surface of the hard housing space, it is possible to advantageously ensure durability of the movable member for which the molding material and hardness are set according to the vibration damping characteristics.

The second mode of the present invention provides the fluid-filled vibration damping device according to the first mode, wherein an elastic projection is formed projecting from the rubber buffer, and the movable member is grasped between the wall inner surfaces of the housing space via a formation part of the elastic projection on the rubber buffer.

With the second mode, by the movable member being grasped via the formation part of the elastic projection on the rubber buffer, the movable member allows deformation or displacement not only by the elastic deformation of the rubber buffer, but also by elastic deformation of the elastic projection. Because of that, it is possible to more advantageously obtain the vibration damping effect exhibited by deformation and displacement of the movable member.

The third mode of the present invention provides the fluid-filled vibration damping device according to the second mode, wherein the elastic projection projects facing the wall inner surface of the housing space, and a projecting tip of the elastic projection contacts the wall inner surface of the housing space.

With the third mode, by the projecting tip of the elastic projection contacting the wall inner surface of the housing space, the rubber buffer is deformed so as to separate from the wall inner surface of the housing space at the periphery of the elastic projection. Because of that, when the movable member contacts the wall inner surface of the housing space via the rubber buffer, bending deformation of the rubber buffer is allowed by the gap between the rubber buffer and the wall inner surface of the housing space, the energy attenuation effect based on the internal friction and the like is more effectively exhibited, and it is possible to more advantageously realize a decrease in the striking noise.

The fourth mode of the present invention provides the fluid-filled vibration damping device according to any one of the first through third modes, wherein grasping projections projecting facing the rubber buffer are formed on the respective wall inner surfaces of the housing space, and the grasping projections contact the rubber buffer so that the movable member is grasped between the grasping projections via the rubber buffer.

With the fourth mode, since the hard grasping projections grasp the movable member via the rubber buffer, deformation and displacement of the movable member at the grasping part is suppressed. Because of that, the deformation or displacement volume of the movable member is stable, and it is possible to obtain the target striking noise reduction effect and vibration damping performance with good precision.

The fifth mode of the present invention provides the fluid-filled vibration damping device according to any one of the first through fourth modes, wherein a center part of the movable member is grasped between the wall inner surfaces of the housing space via the rubber buffer.

With the fifth mode, by constraining the center part of the movable member, it is possible to allow elastic deformation of the movable member at both sides that sandwich the center part of the movable member, and more preferably along the entire circumference enclosing the center part. In addition to that, it is possible to shorten with good balance the length for which elastic deformation is allowed (free length) with the movable member at both sides sandwiching the center part, and more preferably at the entire circumference enclosing the center part. By so doing, when inputting a small amplitude vibration, it is possible to manifest minute displacement of the movable member with good balance and to obtain an effective liquid pressure absorption effect, and to reduce the local difference in displacement volume with the moveable member during input of large amplitude vibration, and to effectively reduce the shock of contact on the wall inner surface of the housing space.

The sixth mode of the present invention provides the fluid-filled vibration damping device according to any one of the first through fifth modes, wherein the rubber buffer has a pair of facing plate portions that cover the wall inner surface on a pressure-receiving chamber side and the wall inner surface on an equilibrium chamber side in the housing space, and the facing plate portions are formed independently from each other as separate items.

With the sixth mode, since the pair of facing plate portions are formed as respectively separate items, it is easy to mold the rubber buffer.

The seventh mode of the present invention provides the fluid-filled vibration damping device according to the sixth mode, wherein one of the pair of facing plate portions has a support part projecting facing another of the pair of facing plate portions, and the movable member that extends between facing surfaces of the pair of facing plate portions projects from the support part and comprises a movable film supported by the one of the facing plate portions.

With the seventh mode, since the movable film is integrally formed with the facing plate portion, it is possible to have a smaller number of parts.

The eighth mode of the present invention provides the fluid-filled vibration damping device according to the seventh mode, wherein a connecting part of the movable film that is connected to the support part elastically deforms more easily than a main unit part of the movable film.

With the eighth mode, with the movable film structure, by the connecting part for which it is possible to more easily constrain the deformation than the main unit part of the movable film being allowed to elastically deform more easily, it is possible to more efficiently obtain the vibration damping effect exhibited by elastic deformation of the movable film. Specifically, by having the connecting part that is connected to the support part elastically deform easily, with the movable film, even at the part for which deformation is easily constrained due to being positioned between the main unit part grasped between the wall inner surfaces of the housing space and the connecting part connected to the support part, it is possible to effectively manifest minute displacement by low elasticity of the connecting part during input of low amplitude vibration, and possible to effectively obtain a liquid pressure absorbing effect based on the minute displacement of the movable film. Meanwhile, since the elasticity of the connecting part gradually increases as the displacement volume of the movable film increases, high elasticity is exhibited when large amplitude vibration is input, and in cooperation with the movable film partially being grasped and constrained between the wall inner surfaces of the housing space, it is possible to effectively reduce the impact of the movable film contacting the wall inner surface, and even when it is easy for the connecting part to elastically deform, it is possible to prevent the striking noise from becoming a problem.

The ninth mode of the present invention provides the fluid-filled vibration damping device according to the eighth mode, wherein the connecting part of the movable film elastically deforms easily by its cross sectional area being made smaller than that of the main unit part of the movable film.

With the ninth mode, with the connecting part that becomes the part coupling the movable film and the rubber buffer, it is easy to set the deformation elasticity to be gentle when there is displacement of the movable film in the plate thickness direction. As a result, the minute displacement of the movable film during input particularly of high frequency, low amplitude vibration is generated with excellent responsiveness to the relative pressure fluctuation of the pressure-receiving chamber and the equilibrium chamber, and it is possible to more effectively achieve low action spring reaction by the liquid pressure absorbing mechanism, and to obtain an improvement in the vibration damping performance due to that.

As a more specific constitution with this mode, the tenth mode noted hereafter can be suitably applied.

Specifically, the tenth mode of the present invention provides the fluid-filled vibration damping device according to the ninth mode, wherein the connecting part of the movable film elastically deforms easily by at least one of its thickness dimension and its width dimension being made smaller than that of the main unit part of the movable film.

The eleventh mode of the present invention provides the fluid-filled vibration damping device according to any of the first through fifth modes, wherein the rubber buffer has a pair of facing plate portions that cover the wall inner surface on a pressure-receiving chamber side and the wall inner surface on an equilibrium chamber side in the housing space, and has at least one side plate portion mutually connecting the pair of facing plate portions, and the pair of facing plate portions and the side plate portion are integrally formed.

With the eleventh mode, by the part that covers both wall inner surfaces in the housing space with the rubber buffer being integrally formed, it is possible to reduce the number of parts. In fact, during contact of the movable member, since energy is transmitted between the parts (facing plate portions) that cover both wall inner surfaces, it is possible to efficiently obtain an energy attenuation action on the entire rubber buffer based on the internal friction and the like, and to reduce the striking noise.

The twelfth mode of the present invention provides the fluid-filled vibration damping device according to the eleventh mode, wherein the at least one side plate portion comprises a pair of side plate portions facing each other, the rubber buffer has a hollow shape for which the pair of facing plate portions are connected by the pair of side plate portions, and the movable member is housed and arranged in an inner space enclosed by the pair of facing plate portions and the pair of side plate portions.

With the twelfth mode, by having the rubber buffer be a hollow shape, a reduction in the number of parts and a decrease in the striking noise due to energy transmission are efficiently realized. In fact, by having the movable member housed and arranged in the hollow shaped rubber buffer inner space, it is possible to easily perform the work of arranging the rubber buffer and the movable member in the housing space.

The thirteenth mode of the present invention provides the fluid-filled vibration damping device according to the eleventh or twelfth mode, wherein the movable member comprises a movable film projecting from the side plate portion to between the pair of facing plate portions.

With the thirteenth mode, the facing plate portions of the rubber buffer are integrally connected by the side plate portion, and the side plate portion and the movable member are connected, so it is possible to realize a further reduction in the number of parts, and it is possible to integrally handle the rubber buffer and the movable member, making the work of arranging them in the housing space easier.

Specifically, with the constitution of this mode, if used combined with the third mode, the elastic projection is formed projecting at the opposite side to the inner space in which the movable film is housed, so it is easier to integrally form the rubber buffer, the movable film, and the elastic projection.

The fourteenth mode of the present invention provides the fluid-filled vibration damping device according to the thirteenth mode, wherein a connecting part of the movable film that is connected to the side plate portion elastically deforms more easily than a main unit part of the movable film.

With the fourteenth mode, with the movable film structure, by the connecting part for which deformation is easier to constrain than the main unit part of the movable film being allowed to more easily elastically deform, it is possible to more efficiently obtain a vibration damping effect based on the liquid pressure absorbing action exhibited by elastic deformation of the movable film during input of high frequency, low amplitude vibration. In fact, by the movable film being partially grasped and constrained between the wall inner surfaces of the housing space, and the displacement of the connecting part increasing and exhibiting high elasticity during input of low-frequency, large-amplitude vibration, it is possible to reduce the impact of contact of the movable film on the wall inner surface, and possible to prevent the striking noise being a problem even if the connecting part is made to elastically deform more easily.

The fifteenth mode of the present invention provides the fluid-filled vibration damping device according to the fourteenth mode, wherein the connecting part of the movable film elastically deforms easily by its cross sectional area being made smaller than that of the main unit part of the movable film.

With the fifteenth mode, at the connecting part that becomes the part coupling the movable film and the rubber buffer, it is easy to set the deformation elasticity to be gentle when the movable film is displaced in the plate thickness direction. As a result, minute displacement of the movable film particularly during input of high frequency, low amplitude vibration is generated with excellent responsiveness to the relative pressure fluctuation of the pressure-receiving chamber and the equilibrium chamber, and it is possible to more effectively achieve the low action spring reaction by the liquid pressure absorbing mechanism, and an improvement in the vibration damping performance due to that.

As a more specific constitution of this mode, the sixteenth mode noted below can be suitably applied.

Specifically, the sixteenth mode of the present invention provides the fluid-filled vibration damping device according to the fifteenth mode, wherein the connecting part of the movable film elastically deforms easily by at least one of its thickness dimension and its width dimension being made smaller than that of the main unit part of the movable film.

With the present invention, the wall inner surfaces of the housing space to be struck by the movable member have the rubber buffer arranged so as to be covered thereby, and the movable member is partially grasped in the thickness direction between the wall inner surfaces of the housing space via the rubber buffer. By so doing, in addition to the energy attenuation action by the internal friction and the like of the rubber buffer, by reducing the free length allowed for the deformation and displacement of the movable member, the striking noise that occurs with the contacting of the movable member on the wall inner surface of the housing space is reduced or avoided.

BRIEF DESCRIPTION OF THE DRAWINGS

The foregoing and/or other objects, features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
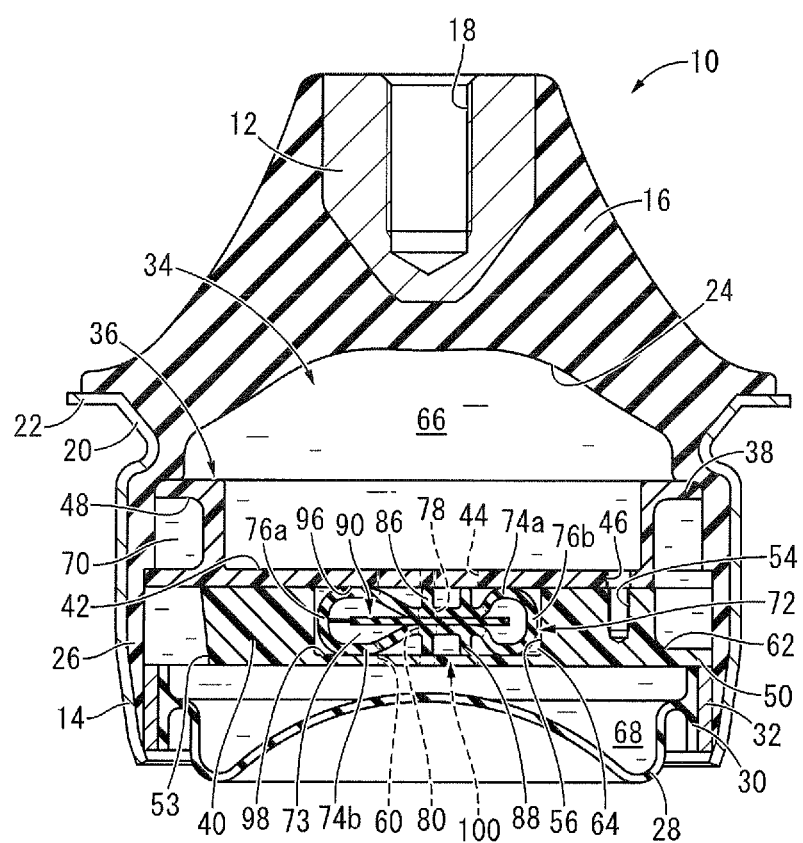
FIG. 1 is a vertical cross section view showing a fluid-filled vibration damping device in the form of an engine mount as a first embodiment of the present invention.

Following, we will describe embodiments of the present invention while referring to the drawings.

FIG. 1 shows an automobile engine mount 10 as the first embodiment of the fluid-filled vibration damping device constituted according to the present invention. The engine mount 10 has a constitution for which a first mounting member 12 and a second mounting member 14 are elastically connected by a main rubber elastic body 16, and the first mounting member 12 is attached to a power unit (not shown), and the second mounting member 14 is attached to a vehicle body (not shown). With the description below, the vertical direction means the vertical direction in FIG. 1 as a rule.

In more specific detail, the first mounting member 12 is a highly rigid member formed using an iron or aluminum alloy or the like, and exhibits overall a small diameter, roughly circular block shape, for which the upper part has a roughly round column shape, and the lower part is roughly a reverse-facing conic trapezoid that gradually shrinks facing downward. Also, on the first mounting member 12, a bolt hole 18 is formed that opens on the top surface extending vertically on the center axis, and a screw thread is formed on the inner circumference surface.

The second mounting member 14 is a highly rigid member formed using the same material as that of the first mounting member 12, and has a thin-walled, large diameter, roughly cylindrical shape. Also, at the top end part of the second mounting member 14 is provided a constricted portion 20 that exhibits a groove shape that opens to the outer circumference side, and a flange portion 22 that projects facing the outer circumference side from the top end of the constricted portion 20.

Then, the first mounting member 12 and the second mounting member 14 are arranged on the same center axis with the first mounting member 12 separated further upward than the second mounting member 14, and the first mounting member 12 and the second mounting member 14 are elastically connected by the main rubber elastic body 16. The main rubber elastic body 16 has a thick-walled, large diameter, roughly conical trapezoid shape, and the small diameter side end part is adhered by vulcanization to the first mounting member 12, and the constricted portion 20 of the second mounting member 14 is adhered by vulcanization overlapping on the outer circumference surface of the large diameter side end part. With this embodiment, the main rubber elastic body 16 is formed as an integrally vulcanized molded article equipped with the first mounting member 12 and the second mounting member 14.

Furthermore, a large-diameter concave portion 24 is formed on the main rubber elastic body 16. The large-diameter concave portion 24 is a concave that opens toward the large diameter side end surface of the main rubber elastic body 16, and exhibits an opposite facing, roughly mortar shape or saucer shape, and is formed at the radial direction center part of the main rubber elastic body 16.

Furthermore, a sealing rubber layer 26 extends further from the outer circumference side than the large-diameter concave portion 24 at the main rubber elastic body 16. The sealing rubber layer 26 is a rubber elastic body having a thin-walled, large diameter roughly round cylinder shape, is integrally formed with the main rubber elastic body 16, and is fixed to the inner circumference surface of the second mounting member 14.

Also, a flexible film 28 is attached to the integrally vulcanized molded article of the main rubber elastic body 16. The flexible film 28 is a rubber film exhibiting a thin-walled round disk or circular dome shape, and is provided with sufficient slack in the axial direction. Furthermore, a ring shaped fixing portion 30 is integrally formed on the outer circumference end part of the flexible film 28, and the outer circumference surface of this fixing portion 30 is adhered by vulcanization to the inner circumference surface of a ring shaped fixing member 32.

Then, the fixing member 32 is inserted in the lower opening part of the second mounting member 14, and by shrinking processing such as all-direction shrinking or the like on the second mounting member 14, the fixing member 32 is fit into the second mounting member 14, and the flexible film 28 is arranged so as to close the lower opening part of the second mounting member 14. A sealing rubber layer 26 is interposed between the second mounting member 14 and the fixing member 32, and the second mounting member 14 and the fixing member 32 are fixed so as to be fluid-tight.

When the flexible film 28 is attached in this way to the integrally vulcanized molded article of the main rubber elastic body 16, between the axial direction facing surfaces of the main rubber elastic body 16 and the flexible film 28, a fluid chamber 34 is formed in which is sealed a non-compressible fluid sealed closed in relation to the external space. The non-compressible fluid sealed in the fluid chamber 34 is not particularly limited, but for example water, alkylene glycol, polyalkylene glycol, silicone oil, or a mixture liquid thereof and the like can be suitably used. Also, to efficiently obtain the vibration damping effect based on the fluid flow action of the fluid described later, it is preferable to use a low viscosity fluid of 0.1 Pa·s or lower.

Also, a partition member 36 is housed and arranged in the fluid chamber 34. The partition member 36 exhibits an overall thick-walled, roughly round disk shape, and is constituted including an upper partition member 38 and a lower partition member 40.

Figure 2:
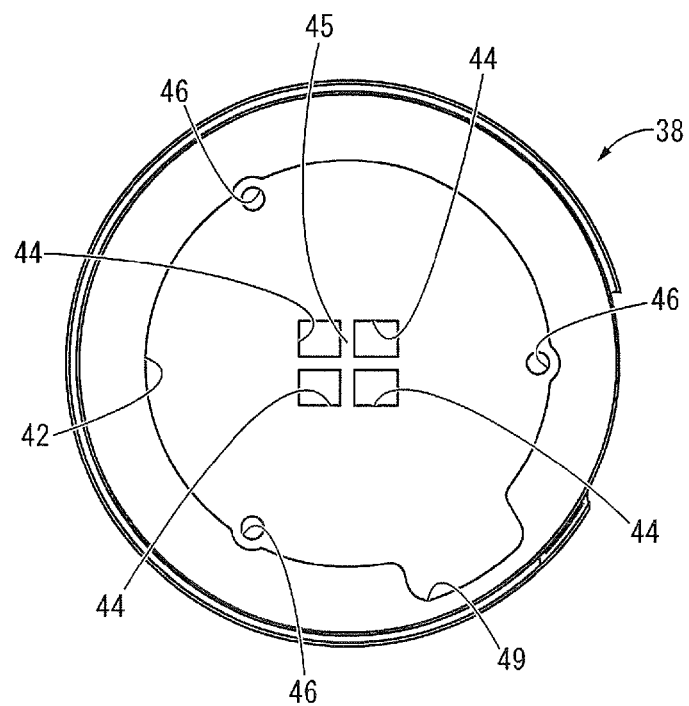
FIG. 2 is a plan view of an upper partition member of the engine mount shown in FIG. 1.

As shown in FIG. 1 and FIG. 2, the upper partition member 38 exhibits a roughly round disk shape, a central concave 42 that opens upward is formed on the radial direction center part, and this is made such that it is possible to efficiently ensure the volume of a pressure-receiving chamber 66 described later. Furthermore, a first communication hole 44 piercing through vertically is formed on the center part of the bottom wall of the central concave 42. Furthermore, this first communication hole 44 has a roughly rectangular shape seen in the axial direction, and four first communication holes 44 are provided separated from each other by a designated distance, and a first crosspiece part 45 is formed extending in roughly a cross shape between the four first communication holes 44. A plurality of upper fit-in holes 46 are formed piercing through at equal intervals on the circumference at the outer circumference part of the bottom wall part of the central concave 42.

Furthermore, an upper groove 48 extending at a designated length in the circumferential direction while opening to the outer circumference surface is faulted on the outer circumference end part of the upper partition member 38, and one end part of the upper groove 48 is in communication with the central concave 42 through an upper communication hole 49, and the other end part opens at the lower surface.

Figure 3:
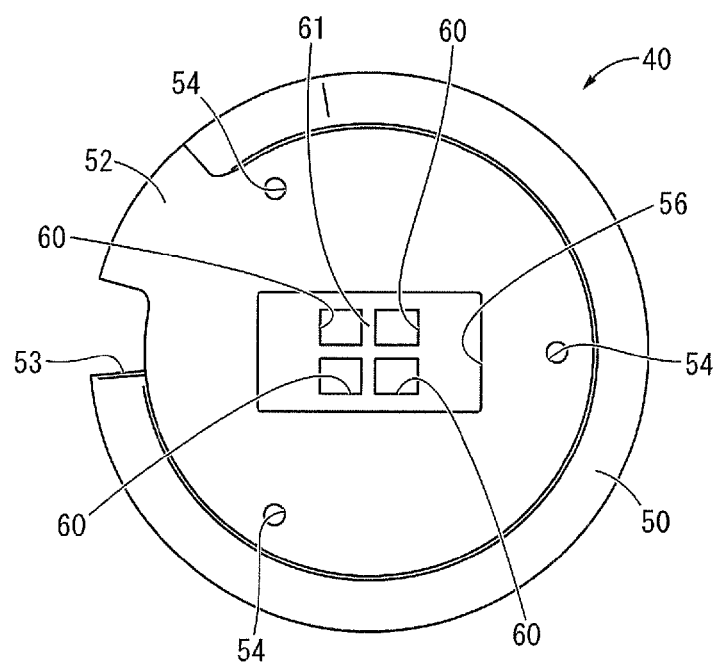
FIG. 3 is a plan view of a lower partition member of the engine mount shown in FIG. 1.

As shown in FIG. 1 and FIG. 3, with the lower partition member 40, the center part exhibits a thick-walled roughly round disk shape, and at the outer circumference side, a thin-walled flange-shaped portion 50 projects from the bottom end. This flange-shaped portion 50 extends at a designated length that does not make a full circle in the circumferential direction, and one end part is a tilted part that gradually has a thicker wall facing the circumferential direction outside and connects with a bulkhead portion 52 having approximately the same thickness as the center part, while the other end part opens in the axial direction downward through a lower communication hole 53. At the thick-walled center part, a plurality of lower fit-in holes 54 open at the top surface at a part deviated from a housing concave 56 described later, and are formed at equal intervals on the circumference.

Also, the housing concave 56 is formed at the radial direction center part of the lower partition member 40. This housing concave 56 is a concave that exhibits a roughly rectangular shape seen in the axial direction and opens upward, and has a cross section shape that is roughly constant vertically.

Furthermore, a second communication hole 60 is formed piercing through on the bottom wall part of the housing concave 56. The second communication hole 60 extends vertically in roughly the same rectangular cross section as the first communication hole 44. Also, the same as the first communication hole 44, four second communication holes 60 are provided mutually separated by a designated distance, and a second crosspiece part 61 extending in roughly a cross shape is formed between the four second communication holes 60.

Then, the upper partition member 38 and the lower partition member 40 are overlapped vertically, a pin is press-fit in a mutually positioned upper fit-in hole 46 and lower fit-in hole 54, and these are fixed to each other by screwing in a screw or the like. Also, by the upper partition member 38 and the upper groove 48 lower wall part being arranged facing and separated upward in relation to the flange-shaped portion 50 of the lower partition member 40, a recessed groove extending in the circumferential direction open to the outer circumference side is formed, and by that recessed groove and the upper groove 48 being in communication with each other at the circumferential direction end parts, a peripheral groove 62 is formed extending in a spiral form at a length of slightly less than two circumferences in the circumferential direction. Furthermore, by the opening part of the housing concave 56 of the lower partition member 40 being covered by the upper partition member 38, a housing space 64 is formed between the upper and lower partition members 38 and 40. The first communication hole 44 is formed piercing through the upper wall part of this housing space 64, and the second communication hole 60 is formed piercing through the lower wall part of the housing space 64.

The partition member 36 constituted as noted above is housed and arranged in the fluid chamber 34 while extending in the axis-perpendicular direction, and its outer circumference end part is supported by the second mounting member 14. By so doing, the fluid chamber 34 is divided into two parts above and below sandwiching the partition member 36. Above the partition member 36, a pressure-receiving chamber 66 whose wall portion is partially constituted by the main rubber elastic body 16 is formed for which internal pressure fluctuations are caused when vibration is input. On the other hand, below the partition member 36, formed is an equilibrium chamber 68 whose wall portion is partially constituted by the flexible film 28 and that easily allows volume changes by deformation of the flexible film 28. The non-compressible fluid described above is sealed in the pressure-receiving chamber 66 and the equilibrium chamber 68.

Also, by having the outer circumference surface of the partition member 36 overlap the second mounting member 14 via the sealing rubber layer 26, the outer circumference opening part of the peripheral groove 62 is covered in a fluid-tight manner by the second mounting member 14, and a tunnel shaped flow path is formed extending in the circumferential direction. By one end part in the circumferential direction of this tunnel shaped flow path being in communication with the pressure-receiving chamber 66, and the other end part in the circumferential direction being in communication with the equilibrium chamber 68, an orifice passage 70 by which the pressure-receiving chamber 66 and the equilibrium chamber 68 are in communication with each other is formed using the peripheral groove 62. With the orifice passage 70, by considering the wall spring rigidity of the pressure-receiving chamber 66 and the equilibrium chamber 68, by adjusting the ratio (A/L) of the path cross section area (A) and the path length (L), tuning is done to a low frequency of approximately 10 Hz corresponding to engine shake.

Figure 4:
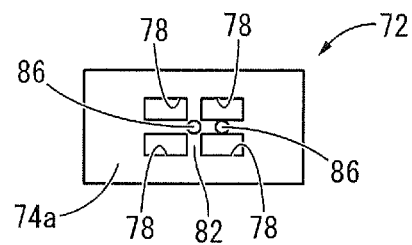
FIG. 4 is a plan view of a rubber buffer of the engine mount shown in FIG. 1.
Figure 5:
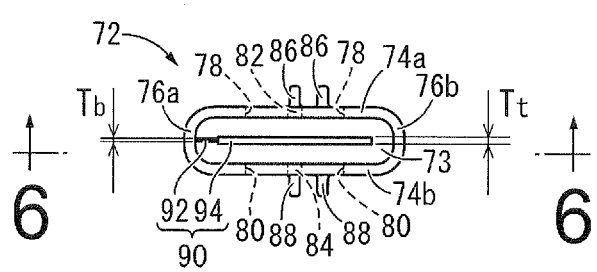
FIG. 5 is a front view of the rubber buffer shown in FIG. 4.
Figure 6:
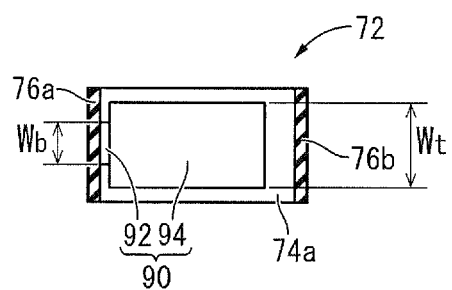
FIG. 6 is a cross section view taken along line 6-6 of FIG. 5.

Also, a rubber buffer 72 is housed and arranged in the housing space 64. As shown in FIG. 4 through FIG. 6, the rubber buffer 72 is a hollow shaped rubber elastic body, and exhibits a roughly rectangular shape from the axial direction view, and is roughly a band shaped tube equipped with an inner space 73 that pierces through in the short side direction (vertical direction in FIG. 4) with this embodiment.

In more specific terms, the rubber buffer 72 is integrally equipped with a pair of facing plate portions 74a and 74b, and a pair of side plate portions 76a and 76b mutually connecting the pair of facing plate portions 74a and 74b.

The pair of facing plate portions 74a and 74b are plate-shaped bodies exhibiting a mutually corresponding roughly rectangular shape from the axial direction view, and are arranged facing each other mutually separated by a designated distance in the vertical direction. Also, a plurality of first window portions 78 are formed on the facing plate portion 74a, and a plurality of second window portions 80 are formed on the facing plate portion 74b. The first window portions 78 and the second window portions 80 are through holes having mutually roughly the same rectangular cross section, and four each are formed mutually separated by a designated distance. Then, between the four first window portions 78, an upper crosspiece part 82 extending in roughly a cross shape is formed, and between the four second window portions 80, a lower crosspiece part 84 is formed extending in roughly a cross shape.

Furthermore, two upper elastic projections 86 are formed on the facing plate portion 74a, and two lower elastic projections 88 are formed on the facing plate portion 74b. The elastic projections 86 and 88 both have the projection tip part as tapers having a roughly round pillar shape, and the upper elastic projection 86 projects facing upward from the upper crosspiece part 82 of the facing plate portion 74a, and the lower elastic projection 88 projects facing downward from the lower crosspiece part 84 of the facing plate portion 74b. With this embodiment, one upper elastic projection 86 is provided at the center of the upper crosspiece part 82, and the other upper elastic projection 86 is provided further to the side plate portion 76b (described later) than the center at the upper crosspiece part 82. Similarly, one lower elastic projection 88 is provided at the center of the lower crosspiece part 84, and the other lower elastic projection 88 is provided further to the side plate portion 76b than the center of the lower crosspiece part 84. The upper elastic projection 86 and the lower elastic projection 88 are provided at mutually corresponding positions, and project facing mutually opposite each other on the same center axis.

Also, both end parts in the lengthwise direction of the pair of facing plate portions 74a and 74b are connected to each other by the pair of side plate portions 76a and 76b. The pair of side plate portions 76a and 76b have plate shapes facing each other in one axis-perpendicular direction extending vertically, and both the upper and lower end parts extend while curving to the facing direction inward to connect to the pair of facing plate portions 74a and 74b. Then, by the pair of facing plate portions 74a and 74b being connected to each other by the pair of side plate portions 76a and 76b, the band shaped tube rubber buffer 72 is formed, and an inner space 73 enclosed by the pair of facing plate portions 74a and 74b and the pair of side plate portions 76a and 76b is formed.

Also, a movable film 90 as the movable member is integrally formed on the rubber buffer 72 of this embodiment. As shown in FIG. 5 and FIG. 6, the movable film 90 overall has a thin-walled roughly plate shape, and by projecting from the side plate portion 76a to the side plate portion 76b, it extends between the facing surfaces of the facing plate portion 74a and the facing plate portion 74b, and is supported by the side plate portion 76a in cantilever form so as to be housed and arranged in the inner space 73. Also, the movable film 90 is integrally equipped with a connecting part 92 connected to the side plate portion 76a and a main unit part 94 projecting from the connecting part 92 to the side plate portion 76b side. The connecting part 92 elastically deforms more easily than the main unit part 94 by its cross sectional area being smaller than that of the main unit part 94. With this embodiment, the thickness dimension $T_b$ of the connecting part 92 is made smaller than the thickness dimension $T_t$ of the main unit part 94, and the width dimension $W_b$ of the connecting part 92 is made smaller than the width dimension $W_t$ of the main unit part 94, thus making the connecting part 92 more easily elastically deformable than the main unit part 94.

As noted above, the rubber buffer 72 integrally equipped with the movable film 90 is arranged in the housing concave 56 of the lower partition member 40 as noted in FIG. 1. Then, by the upper partition member 38 being overlapped on the lower partition member 40 and fixed, the rubber buffer 72 is housed and arranged in the housing space 64, and an upper wall inner surface 96 of the housing space 64 to be struck by the movable film 90 is covered by the facing plate portion 74a, and a lower wall inner surface 98 of the housing space 64 to be struck by the movable film 90 is covered by the facing plate portion 74b. Furthermore, in the state with the rubber buffer 72 arranged in the housing space 64, the pair of side plate portions 76a and 76b are arranged facing separated by a designated gap at the circumference wall inner surfaces (both left and right wall inner surfaces in FIG. 1) of the housing space 64.

Also, the first window portion 78 of the rubber buffer 72 is positioned in relation to the first communication hole 44 of the upper partition member 38 and these are put in communication with each other, and the second window portion 80 of the rubber buffer 72 is positioned in relation to the second communication hole 60 of the lower partition member 40 and these are put in communication with each other. By so doing, a fluid flow path 100 that puts the pressure-receiving chamber 66 and the equilibrium chamber 68 in communication with each other is constituted including the first and second communication holes 44 and 60, the first and second window portions 78 and 80, the housing space 64, and the inner space 73.

The movable film 90 is arranged roughly orthogonally so as to extend in relation to the fluid flow path 100 that extends in the axial direction in this way, and on the top surface of the movable film 90 the liquid pressure of the pressure-receiving chamber 66 is applied through the first communication hole 44 and the first window portion 78, and on the bottom surface of the movable film 90, the liquid pressure of the equilibrium chamber 68 is applied through the second communication hole 60 and the second window portion 80. By so doing, the movable film 90 elastically deforms vertically within the inner space 73 based on the relative pressure fluctuations of the pressure-receiving chamber 66 and the equilibrium chamber 68.

Also, during input of medium frequency, low amplitude vibration which correlates to idling vibration, by having the movable film 90 have minute deformation vertically inside the inner space 73, liquid pressure is transmitted between the pressure-receiving chamber 66 and the equilibrium chamber 68, and during input of low-frequency, large-amplitude vibration, by either of the first window portion 78 or the second window portion 80 being plugged by the movable film 90, the fluid flow path 100 is blocked, and transmission of the liquid pressure through the fluid flow path 100 is prevented. In other words, with this embodiment, during input of medium frequency, low amplitude vibration, the liquid pressure transmission mechanism that transmits the liquid pressure of the pressure-receiving chamber 66 to the equilibrium chamber 68 is constituted containing the movable film 90. With this embodiment, the tuning frequency of the fluid flow path 100 is set to the medium frequency range correlating to the idling vibration, but it is also possible to set it to the high frequency range correlating to a muffled sound while travelling or the like.

Here, with the movable film 90, at the upper surface facing the upper wall inner surface 96 and the lower surface facing the lower wall inner surface 98 of the housing space 64, the center part of the main unit part 94 is grasped in the thickness direction between the upper wall inner surface 96 and the lower wall inner surface 98 via the facing plate portions 74a and 74b of the rubber buffer 72. Thus, the movable film 90 is constrained from deformation and displacement in the thickness direction.

Specifically, at the rubber buffer 72 arranged in the housing space 64, the upper elastic projection 86 of the facing plate portion 74a projects facing the upper wall inner surface 96 of the housing space 64 constituted by the upper partition member 38, and the projecting tip surface contacts the upper wall inner surface 96. Meanwhile, the lower elastic projection 88 of the facing plate portion 74b projects facing the lower wall inner surface 98 of the housing space 64 constituted by the lower partition member 40, and the projecting tip surface contacts the lower wall inner surface 98. Also, in a state with the rubber buffer 72 arranged in the housing space 64, the formation part of the upper elastic projection 86 on the facing plate portion 74a is curved downward and contacts the upper surface of the main unit part 94 of the movable film 90. Furthermore, the formation part of the lower elastic projection 88 on the facing plate portion 74b is curved upward and contacts the lower surface of the main unit part 94 of the movable film 90. By so doing, the main unit part 94 of the movable film 90 is grasped between the upper wall inner surface 96 and the lower wall inner surface 98 via the formation parts of the elastic projections 86 and 88 on the rubber buffer 72, and is elastically positioned in the thickness direction (vertical direction).

With the main unit part 94 of the movable film 90, the middle part in the projecting direction and the width direction is grasped between the upper and lower wall inner surfaces 96 and 98 via the rubber buffer 72, and the tip end side and base end side, and furthermore both sides in the width direction, respectively allow more elastic deformation in the thickness direction than the grasped part. Also, with this embodiment, two each of the upper elastic projections 86 and the lower elastic projections 88 are formed, and the formation position of the upper and lower elastic projection 86 and 88 are set to the tip end side from the center of the main unit part 94 of the movable film 90. By so doing, the part grasped between the upper and lower wall inner surfaces 96 and 98 is set to the projecting tip end side of the main unit part 94, and at the movable film 90, the free length of the tip end side which is easily elastically deformed is set to be small.

By having a first mounting member 12 attached to a power unit (not illustrated), and having a second mounting member 14 attached to a vehicle body (not illustrated), the engine mount 10 constituted in this way is mounted in the vehicle, and the power unit and the vehicle body are mutually connected in a vibration damped manner.

In this state mounted in the vehicle, when a medium frequency, small amplitude vibration correlating to idling vibration frequency is input, the orifice passage 70 is substantially blocked by the generation of anti-resonance by input of higher frequency vibration than the tuning frequency. Meanwhile, based on the relative pressure fluctuation of the pressure-receiving chamber 66 and the equilibrium chamber 68, there is a minute deformation vertically without the movable film 90 contacting the pair of facing plate portions 74a and 74b inside the inner space 73. By so doing, the fluid flow path 100 is held in a communicating state, and the liquid pressure of the pressure-receiving chamber 66 is transmitted to the equilibrium chamber 68 through the fluid flow path 100, so a liquid pressure absorption action is exhibited by the volume change of the equilibrium chamber 68, and it is possible to obtain the target vibration damping effect (vibration insulating effect). As is clear from the description noted above, the liquid pressure transmission mechanism of this embodiment is constituted by the fluid flow path 100 in which the movable film 90 is arranged above the flow path.

Also, when a low-frequency, large-amplitude vibration of approximately 10 Hz correlating to engine shake is input, based on the relative pressure fluctuations of the pressure-receiving chamber 66 and the equilibrium chamber 68, fluid flow action is caused through the orifice passage 70. By so doing, the target vibration damping effect (high attenuation effect) is exhibited based on fluid flow action such as fluid resonance action or the like.

Figure 7:
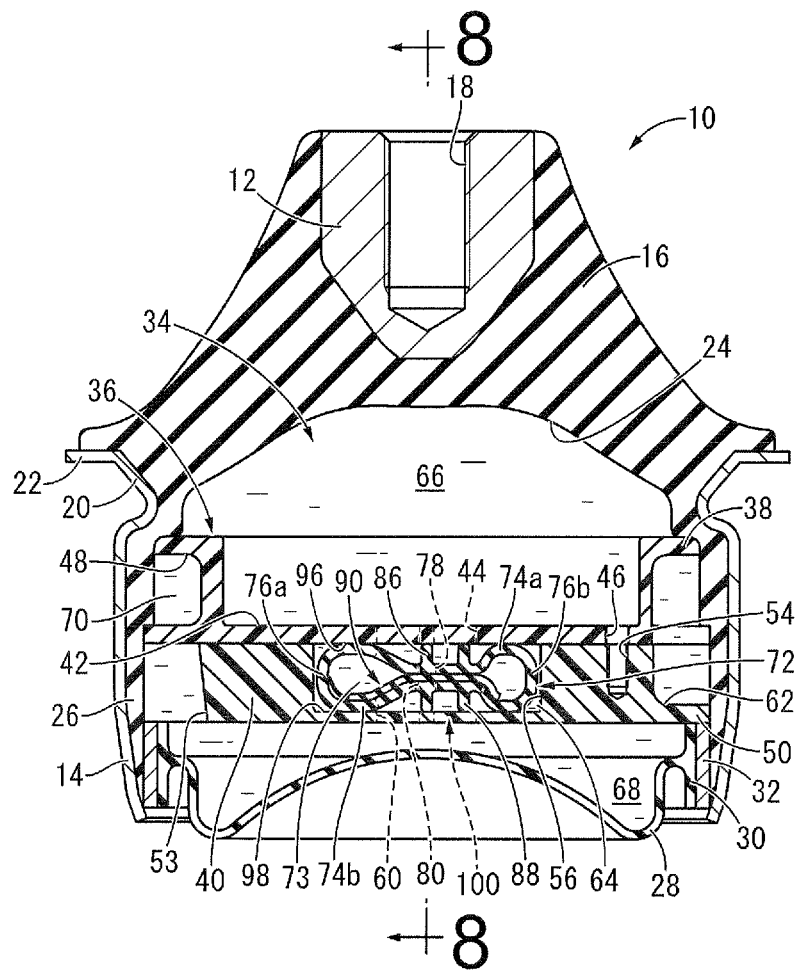
FIG. 7 is a vertical cross section view showing a state with the engine mount shown in FIG. 1 for which a positive pressure due to an input of a low-frequency, large-amplitude vibration is applied to a pressure-receiving chamber.
Figure 8:
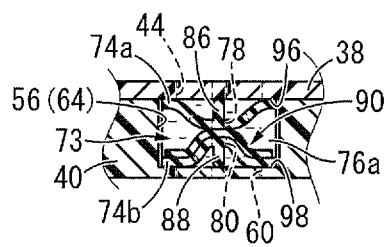
FIG. 8 is a drawing showing a key part in a cross section view taken along line 8-8 of FIG. 7.

During input of low-frequency, large-amplitude vibration, the deformation volume of the movable film 90 in the vertical direction becomes large, so as shown in FIG. 7 and FIG. 8, the outer circumference end part of the main unit part 94 of the movable film 90 is pushed against the pair of facing plate portions 74a and 74b. By so doing, one of the first and second window portions 78 and 80 is closed by the movable film 90, and the fluid flow path 100 is blocked, so the liquid pressure of the pressure-receiving chamber 66 being transmitted to the equilibrium chamber 68 side through the fluid flow path 100 is prevented. As a result, internal pressure fluctuation of the pressure-receiving chamber 66 is effectively caused, and a large fluid volume flowing through the orifice passage 70 is ensured, so the vibration damping effect based on the fluid flow action is effectively exhibited. In other words, with the liquid pressure transmission mechanism of this embodiment, by switching between communication and blocking of the fluid flow path 100 using the movable film 90, it is possible to switch between whether liquid pressure is transmitted by the liquid pressure transmission mechanism between the pressure-receiving chamber 66 and the equilibrium chamber 68.

In light of this, with the engine mount 10, the impact force when the movable film 90 contacts the upper and lower wall inner surfaces 96 and 98 of the housing space 64 is reduced, and the occurrence of a striking noise is prevented. Specifically, first, the upper and lower wall inner surfaces 96 and 98 of the housing space 64 to be struck by the movable film 90 is covered by the facing plate portions 74a and 74b of the rubber buffer 72, and based on the energy attenuation action by the elastic deformation of the facing plate portions 74a and 74b, the impact force during contacting is buffered. In particular, since upper and lower elastic projections 86 and 88 projecting toward the upper and lower wall inner surfaces 96 and 98 of the housing space 64 from the facing plate portions 74a and 74b are provided, a decrease in the contact striking noise is also realized by the energy attenuation action by elastic deformation of the elastic projections 86 and 88.

Also, the main unit part 94 of the movable film 90 for which a large striking noise occurs easily as the deformation volume becomes larger is grasped between the upper and lower wall inner surfaces 96 and 98 via the rubber buffer 72. By so doing, the main unit part 94 of the movable film 90 has the length of the part for which elastic deformation is allowed in the thickness direction (free length) shortened, and the speed during contact on the upper and lower wall inner surfaces 96 and 98 is reduced, so that the impact force by contact is suppressed. In particular with this embodiment, by the main unit part 94 being grasped at the center part, during input of low amplitude vibration, elastic deformation of the thickness direction is allowed along the entire circumference enclosing the center part of the main unit part 94, making it possible to obtain an effective liquid pressure absorbing action, and during input of large-amplitude vibration, it is possible to more effectively reduce the impact force due to contact by reducing the local difference in free length with the main unit part 94. In addition, the movable film 90 is grasped between the formation parts of the elastic projections 86 and 88 on the rubber buffer 72, and the upper elastic projections 86, 86 and the lower elastic projections 88, 88 are respectively formed at the center of the upper and lower crosspiece parts 82 and 84 and the side plate portion 76b side. By so doing, further to the tip end side of the movable film 90 is constrained by the upper and lower wall inner surfaces 96 and 98, so there is more buffering of the impact during contact, and the striking noise is reduced.

Furthermore, as shown in FIG. 7 and FIG. 8, the contact part of the movable film 90 on the facing plate portions 74a and 74b of the rubber buffer 72 is separated from the upper and lower wall inner surfaces 96 and 98 of the housing space 64 along a broad range. Because of that, the impact force during contact is effectively reduced by bending deformation of the facing plate portions 74a and 74b, and the occurrence of striking noise is prevented.

In this way, by the movable film 90 being grasped between the upper and lower wall inner surfaces 96 and 98 via the facing plate portions 74a and 74b of the rubber buffer 72, the striking noise when the movable film 90 contacts the upper and lower wall inner surfaces 96 and 98 of the housing space 64 has a reduction in the contacting speed or the like effectively realized by an energy attenuation action based on the internal friction or the like of the rubber buffer 72 or by a reduction in the free length of the movable film 90.

In fact, since there is a sufficient decrease in the contact striking noise as noted above, it is possible to use a relatively large size, large mass movable film 90, and to set a large area that can be covered by the movable film 90. By so doing, it is possible to ensure a large opening area of the first and second communication holes 44 and 60 and the first and second window portions 78 and 80, so it is possible up to a higher frequency to avoid the substantial clogging due to anti-resonance of the fluid flow path 100. Therefore, it is possible to obtain an effective vibration damping effect on input of higher frequency vibration as well, and to realize excellent vibration damping performance.

Also, the movable film 90 is equipped with the thin-walled, narrow width connecting part 92 connected to the side plate portion 76a, and the connecting part 92 elastically deforms more easily than the main unit part 94. By so doing, especially further to the base end side than the part grasped between the upper and lower wall inner surfaces 96 and 98, elastic deformation of the movable film 90 occurs more easily, and the liquid pressure absorption action during input of small amplitude vibration and the striking noise reduction effect during input of large amplitude vibration are both effectively realized. Specifically, with the movable film 90, deformation is easily constricted between particularly the center part grasped by the upper and lower wall inner surfaces 96 and 98 and the connecting part 92 connected to the side plate portion 76a, but since the connecting part 92 is easily elastically deformed, deformation in the plate thickness direction is effectively manifested. Also, the elastic deformation volume of the connecting part 92 becomes larger according to the displacement volume of the movable film 90, and the elastic force of the connecting part 92 applied to the movable film 90 becomes larger linearly or non-linearly. Because of that, while during input of small amplitude vibration in relation to the minute displacement of the movable film 90, the elastic force applied to the movable film 90 by the connecting part 92 also becomes smaller, easily allowing displacement of the movable film 90, during input of large amplitude vibration, the effective elastic force for reducing the striking energy on the upper and lower inner surfaces of the housing space 64 by the movable film 90 is applied to the movable film 90 by the connecting part 92. Also, during input of large amplitude vibration, by the connecting part 92 elastically deforming easily, it is possible to rapidly perform blocking of the fluid flow path 100. Also, by elastic deformation occurring easily by making the cross section area of the connecting part 92 smaller than that of the main unit part 94, even in a case when the movable film 90 is integrally formed with the rubber buffer 72 such as with this embodiment, it is possible to easily adjust the elasticity of the connecting part 92.

Also, with the rubber buffer 72 of this embodiment, the pair of facing plate portions 74a and 74b and the pair of side plate portions 76a and 76b are integrally formed, and overall are an integral band shaped tube, so the number of parts is made smaller, and arranging inside the housing space 64 is also easier. In fact, when the movable film 90 contacts either one of the pair of facing plate portions 74a and 74b, the energy due to contact is transmitted to the other of the pair of facing plate portions 74a and 74b via the side plate portions 76a and 76b, so the energy attenuation action due to internal friction or the like is exhibited overall for the rubber buffer 72, and further reduction in the contact striking noise is realized.

Furthermore, with this embodiment, the movable film 90 is also integrally formed with the side plate portion 76a, so a further reduction in the number of parts is realized, and work for arranging the movable member in the inner space 73 is unnecessary. In fact, the upper elastic projections 86, 86 are formed projecting upward from the facing plate portion 74a, and the lower elastic projections 88, 88 are formed projecting downward from the facing plate portion 74b. Because of that, the movable film 90 is integrally formed with the side plate portion 76a, and it becomes easy to form the elastic projection on the rubber buffer 72 arranged in the inner space 73 in advance.

Figure 9:
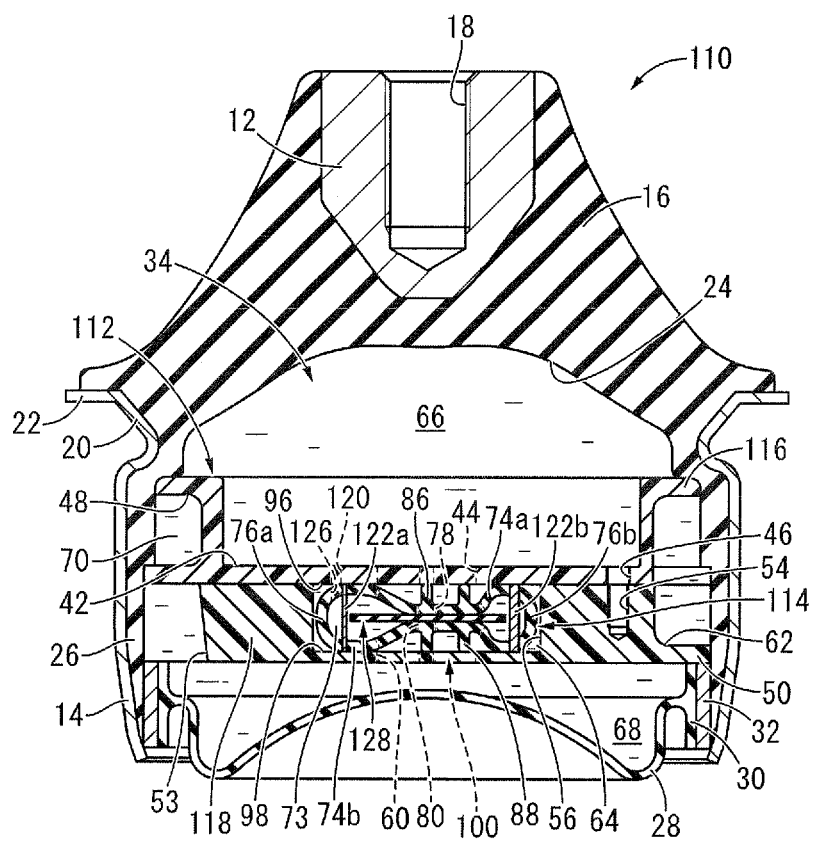
FIG. 9 is a vertical cross section view showing an engine mount as a second embodiment of the present invention.

FIG. 9 shows an engine mount 110 for an automobile as a second embodiment of the fluid-filled vibration damping device constituted according to the present invention. With the engine mount 110, there is a constitution for which a rubber buffer 114 is arranged in the housing space 64 of the partition member 112. With the description below, substantially the same members and parts as those of the first embodiment are given the same code numbers in the drawings, and a description will be omitted.

Figure 10:
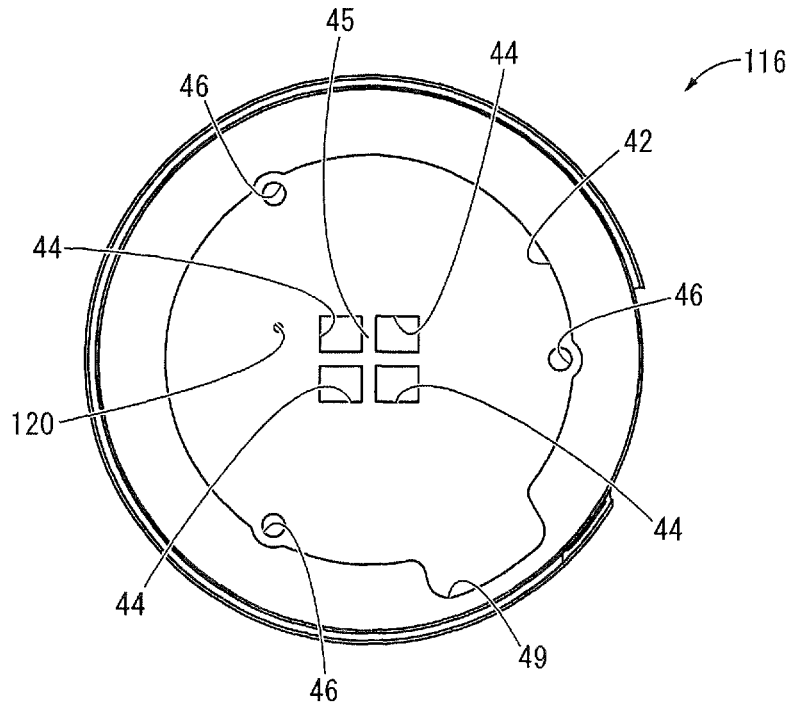
FIG. 10 is a plan view of an upper partition member of the engine mount shown in FIG. 9.

In more specific detail, the partition member 112 is constituted including an upper partition member 116 and a lower partition member 118. As shown in FIG. 9 and FIG. 10, the upper partition member 116 has a constitution for which a short-circuit hole 120 is formed on the upper partition member 116 of the first embodiment. The short-circuit hole 120 is a small diameter hole that extends in a circular cross section, and the bottom wall part of the central concave 42 is formed piercing through vertically further to the outer circumference side than the first window portion 78.

Also, as shown in FIG. 9, at the lower partition member 118, a pair of insertion pins 122a and 122b project facing upward from the bottom wall part at both end parts in the lengthwise direction of the housing concave 56. With this embodiment, the insertion pin 122a has a smaller diameter than the insertion pin 122b, and by being inserted into insertion holes 124a and 124b described later, the orientation of the rubber buffer 114 inside the housing space 64 is determined. Also, with this embodiment, the insertion pins 122a and 122b are provided by inserting separate pins from the lower partition member 118 when forming the lower partition member 118, but can also be integrally formed with the lower partition member 118.

Also, the partition member 112 is constituted by the upper partition member 116 being overlapped on the top surface of the lower partition member 118 and being fixed, and the housing space 64 is formed between the upper partition member 116 and the lower partition member 118. Also, the lower side opening part of the short-circuit hole 120 formed on the upper partition member 116 opens at the upper wall inner surface 96 of the housing space 64, and the pressure-receiving chamber 66 and the housing space 64 are always in communication by the short-circuit hole 120.

Figure 11:
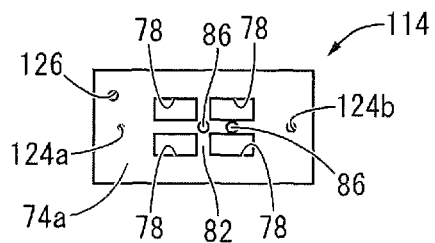
FIG. 11 is a plan view of a rubber buffer of the engine mount shown in FIG. 9.
Figure 12:
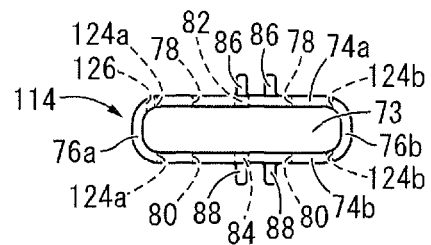
FIG. 12 is a front view of the rubber buffer shown in FIG. 11.

Also, rubber buffer 114 is arranged in the housing space 64. The same as with the rubber buffer 72 shown in FIG. 9, FIG. 11, and FIG. 12, the rubber buffer 114 is a hollow band shaped tube integrally equipped with the pair of facing plate portions 74a and 74b and the pair of side plate portions 76a and 76b, and two upper elastic projections 86, 86 are formed on the facing plate portions 74a and two lower elastic projections 88, 88 are formed on the facing plate portions 74b (see FIG. 9, FIG. 11, and FIG. 12).

Furthermore, a pair of insertion holes 124a and 124b are respectively formed on the facing plate portions 74a and 74b of the rubber buffer 114. The insertion holes 124a and 124b are small diameter circular holes, and the insertion hole 124a has a smaller diameter than the insertion hole 124b, and the insertion hole 124a has a cross section shape corresponding to the insertion pin 122a, and the insertion hole 124b has a cross section shape corresponding to the insertion pin 122b.

Furthermore, a short-circuit window 126 is formed on the facing plate portion 74a of the rubber buffer 114. The short-circuit window 126 is a circular hole roughly corresponding to the short-circuit hole 120, vertically pierces through the facing plate portion 74a, and the lower side opening part communicates with the inner space 73. With this embodiment, the short-circuit window 126 is formed further to the outside in the lengthwise direction (lateral direction in FIG. 9) than the insertion hole 124a/124b.

The rubber buffer 114 constituted in this way is arranged in the housing space 64. Furthermore, by the insertion pin 122a being inserted in the insertion hole 124a, and the insertion pin 122b being inserted in the insertion hole 124b, the orientation of the rubber buffer 114 within the housing space 64 is determined, and it is positioned in an axis-perpendicular direction within the housing space 64. In this way, with the engine mount 110 of this embodiment, by the insertion of the insertion pins 122a and 122b into the insertion holes 124a and 124b, arrangement of the rubber buffer 114 into the housing space 64 in a suitable orientation can be performed easily.

Furthermore, in the state with the rubber buffer 114 arranged in the housing space 64, the short-circuit window 126 formed on the facing plate portion 74a of the rubber buffer 114 is in communication with the short-circuit hole 120 formed on the upper partition member 116, and the inner space 73 is always in a communicating state with the pressure-receiving chamber 66.

Also, a movable plate 128 as the movable member is arranged in the inner space 73 of the rubber buffer 114. The movable plate 128 is a rectangular plate-shaped member formed using a rubber elastic body, and is a separate item from the rubber buffer 114. Also, the movable plate 128 is arranged so as to extend roughly orthogonally to the fluid flow path 100 inside the inner space 73, the liquid pressure of the pressure-receiving chamber 66 is applied to the top surface, and the liquid pressure of the equilibrium chamber 68 is applied to the bottom surface. The movable plate 128 dimension in the lengthwise direction (lateral direction in FIG. 9) is smaller than the distance between the pair of insertion pins 122a and 122b, and this is arranged between the insertion pin 122a and the insertion pin 122b. By so doing, the short-circuit window 126 formed on the facing plate portion 74a of the rubber buffer 114 is formed at a position deviated from the movable plate 128, and the always communicating state is maintained without closing by the movable plate 128.

Furthermore, with the movable plate 128, the center part is elastically grasped between the upper wall inner surface 96 and the lower wall inner surface 98 of the housing space 64 via the formation parts of the elastic projections 86 and 88 on the facing plate portions 74a and 74b of the rubber buffer 114. By so doing, the movable plate 128 has its free length of the part for which elastic deformation is allowed made smaller in relation to the relative liquid pressure fluctuations of the pressure-receiving chamber 66 and the equilibrium chamber 68. Because of that, by the input of low-frequency, large-amplitude vibration correlating to engine shake, even when the movable plate 128 elastically deforms and contacts either of the upper and lower wall inner surfaces 96 and 98 of the housing space 64, by the speed during contact or the mass of the contacting part being reduced, the impact force is reduced, and the striking noise due to contact is prevented.

Also, by the movable member being a movable plate 128 that is a separate item from the rubber buffer 114, the movable plate 128 outer circumference part deforms easily along the entire circumference without being constrained by the rubber buffer 114. Because of that, during input of medium to high frequency, low amplitude vibration, the liquid pressure transmission action is efficiently exhibited, and it is possible to advantageously obtain the target vibration damping effect.

Also, when there is a rapid and significant drop in liquid pressure of the pressure-receiving chamber 66 when a markedly large amplitude vibration is input, such as by riding over a bump with an automobile or the like, air bubbles due to cavitation are generated, and there are cases when an abnormal noise occurs due to the impact force caused when the air bubbles disappear. In light of that, with the engine mount 110 of this embodiment, the pressure-receiving chamber 66 and the inner space 73 are always in communication through the short-circuit hole 120 and the short-circuit window 126, excessive negative pressure acts in the pressure-receiving chamber 66, and even in a state with the movable plate 128 closing the first window portion 78, the pressure-receiving chamber 66 and the equilibrium chamber 68 are kept in a communicating state through the short-circuit hole 120 and the short-circuit window 126. Because of that, by fluid flowing into the pressure-receiving chamber 66 from the equilibrium chamber 68, the negative pressure of the pressure-receiving chamber 66 is reduced, and as a result of avoiding gas phase separation due to cavitation, the occurrence of abnormal noise due to cavitation is prevented.

Figure 13:
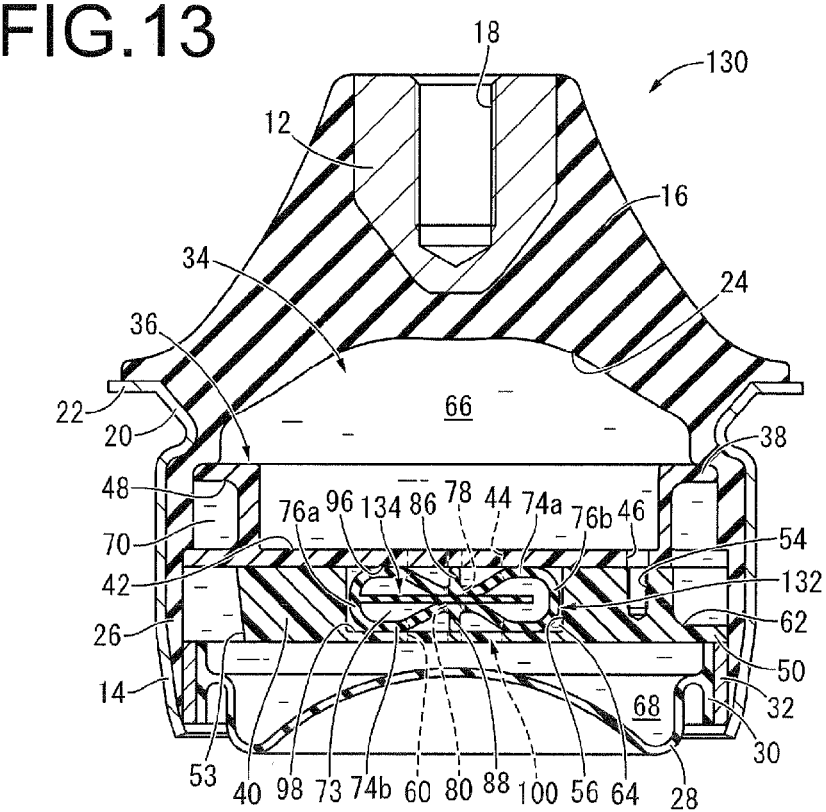
FIG. 13 is a vertical cross section view showing an engine mount as a third embodiment of the present invention.

FIG. 13 shows an automobile engine mount 130 as a third embodiment of the fluid-filled vibration damping device constituted according to the present invention. The engine mount 130 has a constitution with which rubber buffer 132 is arranged in the housing space 64 of the partition member 36.

The rubber buffer 132 is a hollow band shaped tube integrally equipped with the pair of facing plate portions 74a and 74b and the pair of side plate portions 76a and 76b, and a movable film 134 as the movable member integrally projects from one side plate portion 76a. The movable film 134 has a roughly rectangular plate shape, and overall is formed with roughly fixed thickness dimensions and width dimensions.

Furthermore, the upper elastic projection 86 projecting upward is integrally formed on the facing plate portion 74a of the rubber buffer 132, and the lower elastic projection 88 projecting downward is integrally formed on the facing plate portion 74b. With this embodiment, one each of the upper elastic projection 86 and the lower elastic projection 88 is formed, and they project facing in the reverse in the axial direction from the center of each of the upper crosspiece part 82 and the lower crosspiece part 84.

With the engine mount 130 constituted in this way as well, the movable film 134 is grasped between the upper and lower wall inner surfaces 96 and 98 of the housing space 64 via the formation parts of the elastic projections 86 and 88 on the facing plate portions 74a and 74b, so the striking noise during contact is reduced.

Figure 14:
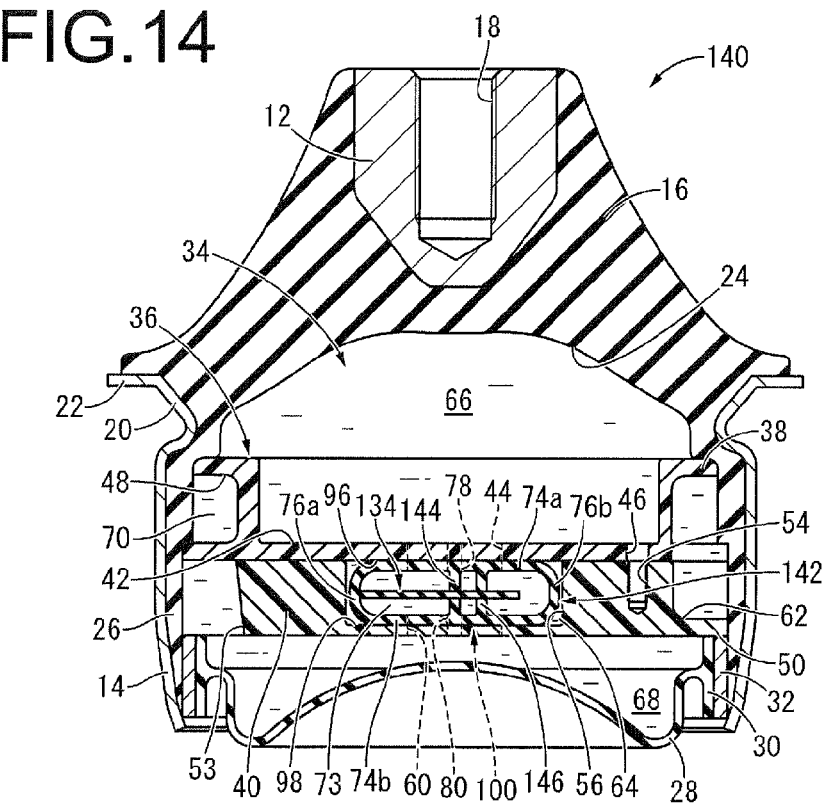
FIG. 14 is a vertical cross section view showing an engine mount as a fourth embodiment of the present invention.

FIG. 14 shows an automobile engine mount 140 as a fourth embodiment of the fluid-filled vibration damping device constituted according to the present invention. The engine mount 140 has a constitution with which rubber buffer 142 is arranged in the housing space 64.

The rubber buffer 142 is a hollow band shaped tube integrally equipped with the pair of facing plate portions 74a and 74b and the pair of the side plate portions 76a and 76b, and the movable film 134 integrally projects from one side plate portion 76a. The movable film 134 has a roughly rectangular plate shape, and overall has roughly fixed thickness dimensions and width dimensions.

Furthermore, an upper elastic projection 144 projecting downward is integrally formed on the facing plate portion 74a of the rubber buffer 142, and a lower elastic projection 146 projecting upward is integrally formed on the facing plate portion 74b. With this embodiment, two each of the upper elastic projections 144 and the lower elastic projections 146 are formed, and the elastic projections 144 and 146 on one hand are provided on the respective centers of the upper crosspiece part 82 and the lower crosspiece part 84, while the elastic projections 144 and 146 on the other are provided further to the side plate portion 76b side than the respective centers of the upper crosspiece part 82 and the lower crosspiece part 84. In other words, with the rubber buffer 142 of this embodiment, the upper and lower elastic projections 144 and 146 project facing the inward facing direction of the facing plate portion 74a and the facing plate portion 74b at mutually corresponding positions, and face each other in the axial direction vertically separated by a designated distance.

Also, the center part of the movable film 134 is grasped between the projecting tip end surfaces of the upper and lower elastic projections 144 and 146, and the elastic deformation in the thickness direction is restricted. With this embodiment, the elastic projections 144 and 146 project to the inward facing direction of the facing plate portions 74a and 74b, so in a state with the rubber buffer 142 arranged in the housing space 64, roughly the entirety of the facing plate portions 74a and 74b overlap on the upper and lower wall inner surfaces 96 and 98 of the housing space 64.

With this kind of engine mount 140 as well, the striking noise that occurs by contacting of the movable film 134 on the wall inner surfaces 96 and 98 of the housing space 64 is reduced. Also, in a state with the rubber buffer 142 arranged in the housing space 64, since the initial stress acting on the facing plate portions 74a and 74b and the upper and lower elastic projections 144 and 146 is small, there is an improvement in the durability of the rubber buffer 142.

Figure 15:
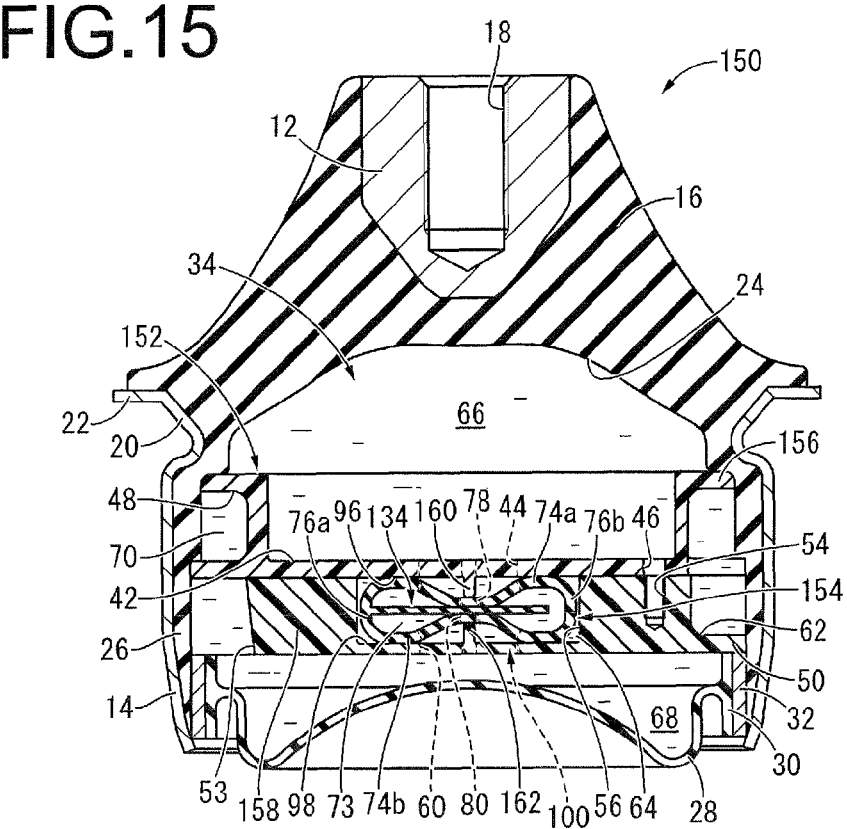
FIG. 15 is a vertical cross section view showing an engine mount as a fifth embodiment of the present invention.

FIG. 15 shows an automobile engine mount 150 as a fifth embodiment of the fluid-filled vibration damping device constituted according to the present invention. The engine mount 150 has a constitution with which rubber buffer 154 is arranged in the housing space 64 of a partition member 152.

The partition member 152 is equipped with an upper partition member 156 and a lower partition member 158. The upper partition member 156 has a constitution for which an upper grasping projection 160 is integrally formed with the upper partition member 38 of the first embodiment. The upper grasping projection 160 has a small diameter, roughly round pillar shape, and projects facing downward from the radial direction center of the first crosspiece part 45 into the housing space 64. The lower partition member 158 has a constitution with which a lower grasping projection 162 is integrally formed with the lower partition member 40 of the first embodiment. The lower grasping projection 162 has a small diameter, roughly round pillar shape, and projects facing upward from the radial direction center of the second crosspiece part 61 into the housing space 64.

Also, by the upper partition member 156 and the lower partition member 158 being overlapped vertically and fixed to each other, a partition member 152 equipped with the housing space 64 is formed. Also, in a state with the upper partition member 156 and the lower partition member 158 fixed, the upper grasping projection 160 and the lower grasping projection 162 are arranging facing separated vertically by a designated distance.

Also, the rubber buffer 154 is arranged in the housing space 64. The rubber buffer 154 is a hollow band shaped tube integrally equipped with the pair of facing plate portions 74a and 74b and the pair of side plate portions 76a and 76b. Also, on one of the side plate portions 76a, a rectangular plate-shaped movable film 134 with roughly a fixed thickness is integrally formed, and extends between the facing surfaces of the pair of facing plate portions 74a and 74b. In other words, the rubber buffer 154 has a constitution for which the elastic projections 86 and 88 of the rubber buffer 132 of the third embodiment shown in FIG. 13 are omitted.

Also, the rubber buffer 154 is arranged in the housing space 64, and the facing plate portions 74a and 74b are overlapped on the upper and lower wall inner surfaces 96 and 98 of the housing space 64. Also, the upper grasping projection 160 projects facing the facing plate portion 74a, and the lower grasping projection 162 projects facing the facing plate portion 74b, and by the tips of the upper and lower grasping projections 160 and 162 contacting the facing plate portions 74a and 74b, the center parts of the facing plate portions 74a and 74b are pushed to the movable film 134 side by the upper and lower grasping projections 160 and 162. By so doing, the movable film 134 is grasped in the thickness direction via the facing plate portions 74a and 74b of the rubber buffer 154 between the formation parts of the upper and lower grasping projections 160 and 162 on the upper and lower wall inner surface 96 and 98 of the housing space 64.

With this kind of engine mount 150 constituted according to this embodiment as well, the striking noise that occurs by contact of the movable film 134 on the upper and lower wall inner surface 96 and 98 of the housing space 64 is reduced. Furthermore, since the movable film 134 is sandwiched by hard grasping projections 160 and 162 integrally formed with the partition member 152, the deformation and displacement of the movable film 134 at the part constrained by the grasping projections 160 and 162 is suppressed with more stability, and the striking noise reduction effect is exhibited more advantageously. In fact, since the movable film 134 is grasped between the tip end surfaces of the grasping projections 160 and 162 via the facing plate portions 74a and 74b of the rubber buffer 154, it is possible to prevent damage due to deformation in the thickness direction by the movable film 134 which uses the grasping part as a fulcrum.

Figure 16:
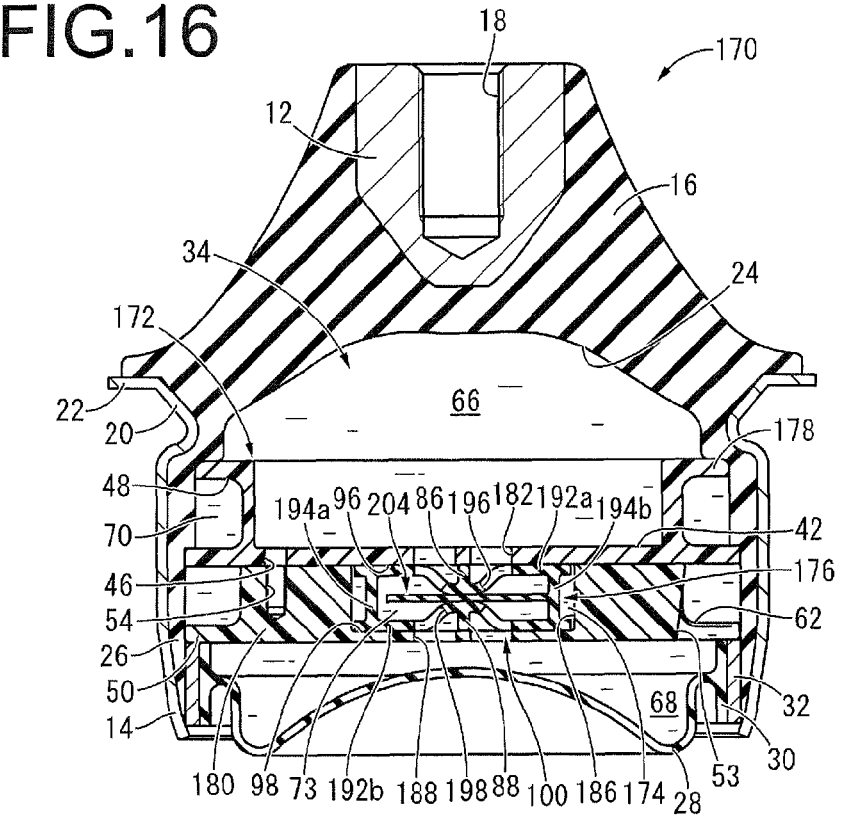
FIG. 16 is a vertical cross section view showing an engine mount as a sixth embodiment of the present invention.

FIG. 16 shows an automobile engine mount 170 as a sixth embodiment of the fluid-filled vibration damping device constituted according to the present invention. The engine mount 170 has a constitution with which rubber buffer 176 is arranged in a housing space 174 of the partition member 172.

Figure 17:
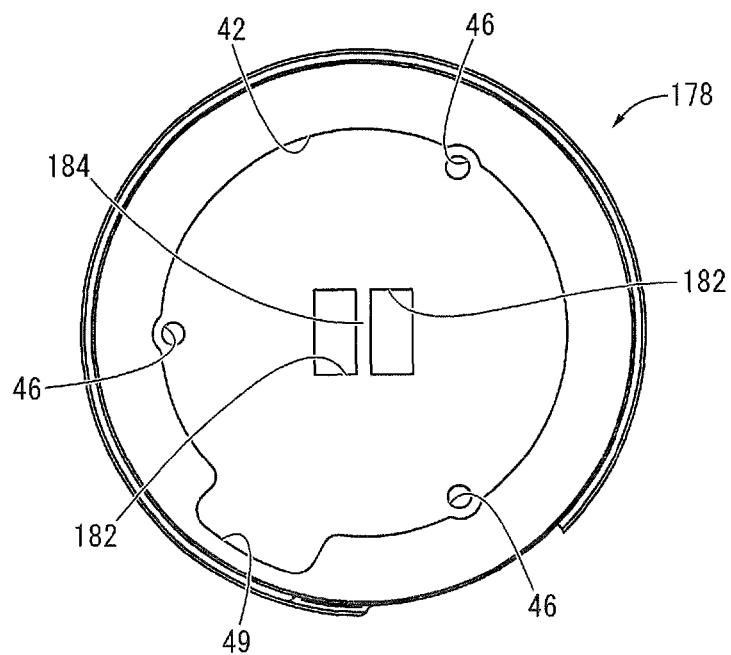
FIG. 17 is a plan view of an upper partition member of the engine mount shown in FIG. 16.

The partition member 172 is equipped with an upper partition member 178 and a lower partition member 180. As shown in FIG. 16 and FIG. 17, the upper partition member 178 has a roughly round disk shape, and a central concave 42 that opens on the top surface is formed. Furthermore, at the radial direction center part of the upper partition member 178, first communication holes 182 that vertically pierce through the bottom wall part of the central concave 42 are formed. This first communication hole 182 each has a roughly fixed rectangular cross section, and by two first communication holes 182 and 182 being formed separated by a designated distance in the short side direction (lateral direction in FIG. 17), a first crosspiece part 184 is formed between the two first communication holes 182 and 182.

Figure 18:
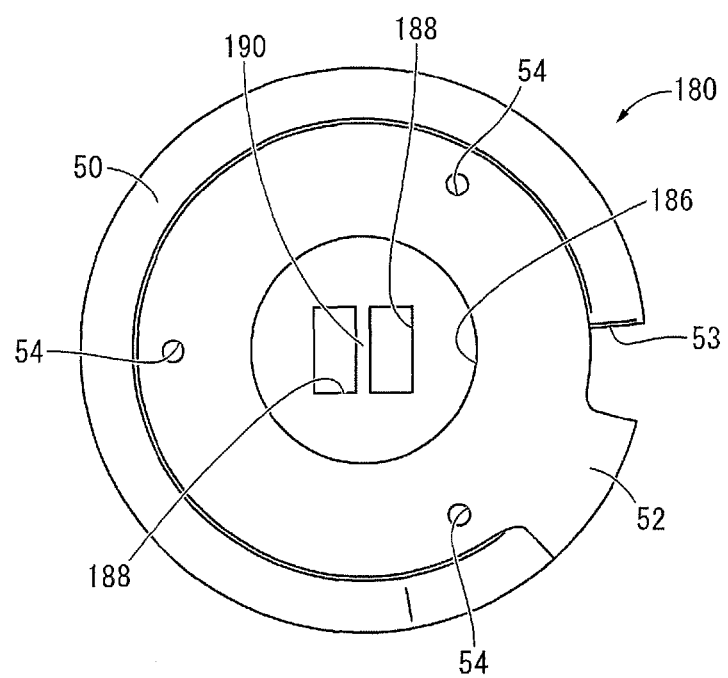
FIG. 18 is a plan view of a lower partition member of the engine mount shown in FIG. 16.

Meanwhile, as shown in FIG. 16 and FIG. 18, the lower partition member 180 has a roughly rough disk shape, and a housing concave 186 that opens at the upper surface is formed at the radial direction center part. This housing concave 186 extends vertically in a roughly fixed round cross section, and on its bottom wall part, second communication holes 188 are formed piercing through vertically. The second communication hole 188 each extends vertically with roughly the same rectangular cross section as that of the first communication hole 182, and by having two second communication holes 188 and 188 formed separated by a designated distance in the short side direction (lateral direction in FIG. 18), a second crosspiece part 190 is formed between the two second communication holes 188 and 188.

Figure 19:
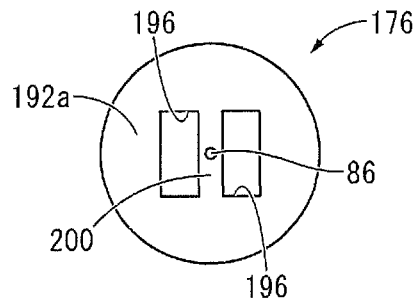
FIG. 19 is a plan view of a rubber buffer of the engine mount shown in FIG. 16.
Figure 20:
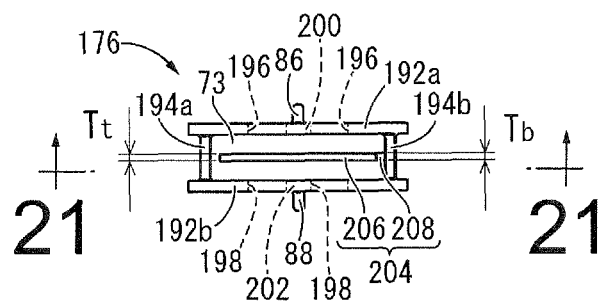
FIG. 20 is a plan view of the rubber buffer shown in FIG. 19.
Figure 21:
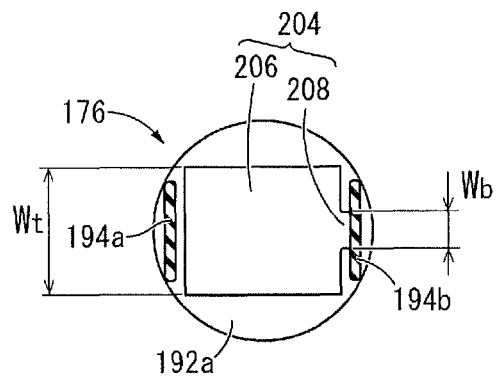
FIG. 21 is a cross section view taken along line 21-21 of FIG. 20.

Also, by the upper partition member 178 and the lower partition member 180 being vertically overlapped and fixed to each other, the partition member 172 is formed. Also, by the opening part of the housing concave 186 of the lower partition member 180 being covered by the upper partition member 178, the housing space 174 is formed, and the rubber buffer 176 is arranged in this housing space 174. As shown in FIG. 19 through FIG. 21, the rubber buffer 176 is equipped with a pair of facing plate portions 192a and 192b, and a pair of side plate portions 194a and 194b that mutually connect the facing plate portions 192a and 192b.

The facing plate portions 192a and 192b both exhibit a roughly round disk shape, and two first window portions 196 are formed piercing through in the thickness direction on the facing plate portion 192a, and two second window portions 198 are formed piercing through in the thickness direction on the facing plate portion 192b. The first and second window portions 196 and 198 have roughly the same roughly rectangular cross section as each other, two each are formed separated by a designated distance in the short side direction, and an upper crosspiece part 200 is formed between the two first window portions 196 and 196, and a lower crosspiece part 202 is formed between the two second window portions 198 and 198. Also, the small diameter round pillar shaped upper elastic projection 86 projecting upward is integrally formed on the upper crosspiece part 200 of the facing plate portion 192a, and a small diameter round pillar shaped lower elastic projection 88 projecting downward is integrally formed on a lower crosspiece part 202 of the facing plate portion 192b.

Also, a pair of side plate portions 194a and 194b that extend orthogonally to the pair of facing plate portions 192a and 192b are provided between the facing pair of facing plate portions 192a and 192b. The side plate portions 194a and 194b have mutually roughly the same rectangular plate shape, and face each other separated in the axis-perpendicular direction (lateral direction in FIG. 20). Also, the side plate portions 194a and 194b are integrally formed with the facing plate portions 192a and 192b, and those facing plate portions 192a and 192b are connected to each other by the side plate portions 194a and 194b, and overall, a hollow shaped rubber buffer 176 is formed. With the rubber buffer 176, an area enclosed by the facing plate portions 192a and 192b and the side plate portions 194a and 194b is used as the inner space 73.

Also, a movable film 204 as the movable member is arranged in the inner space 73 of the rubber buffer 176. The movable film 204 has a plate shape that extends in the axial orthogonal direction with roughly a fixed thickness dimension, and as shown in FIG. 21, is integrally equipped with a main unit part 206 exhibiting a wide width rectangular plate shape and a connecting part 208 connected to the side plate portion 194b. The movable film 204 constituted in this way extends separated from both of the facing plate portions 192a and 192b between the facing surfaces of the pair of facing plate portions 192a and 192b, and by a connecting part 208 being integrally formed with the side plate portion 194b, it is integrally formed with the rubber buffer 176, and is supported in cantilever fashion. While the thickness dimension $T_b$ of the connecting part 208 is equal to the thickness dimension $T_t$ of the main unit part 206, the width dimension $W_b$ of the connecting part 208 is smaller than the width dimension $W_t$ of the main unit part 206. By so doing, the cross section area of the connecting part 208 is smaller than that of the main unit part 206, and the connecting part 208 elastically deforms more easily than the main unit part 206.

Also, as shown in FIG. 16, the rubber buffer 176 integrally equipped with the movable film 204 is arranged in the housing space 174 of the partition member 172, and the facing plate portion 192a is overlapped on the upper wall inner surface 96 of the housing space 174, and the facing plate portion 192b is overlapped on the lower wall inner surface 98 of the housing space 174. By so doing, the first communication hole 182 and the first window portion 196 are in communication, and the second communication hole 188 and the second window portion 198 are in communication, and the fluid flow path 100 is formed by which the pressure-receiving chamber 66 and the equilibrium chamber 68 are in communication with each other.

Furthermore, the projecting tip end surface of the upper elastic projection 86 contacts the upper wall inner surface 96 of the housing space 174, and the projecting tip end surface of the lower elastic projection 88 contacts the lower wall inner surface 98 of the housing space 174. By so doing, at the formation parts of the upper and lower elastic projections 86 and 88, facing plate portions 192*a* and 192*b* are pushed to the inward facing direction, separated from the upper and lower wall inner surfaces 96 and 98 of the housing space 174. As a result, the center part of the main unit part 206 of the movable film 204 is grasped in the thickness direction between the upper and lower wall inner surfaces 96 and 98 of the housing space 174 via the facing plate portions 192*a* and 192*b* of the rubber buffer 176.

With this kind of engine mount 170 of this embodiment as well, by the main unit part 206 of the movable film 204 being grasped between the upper and lower wall inner surfaces 96 and 98 of the housing space 174 and being constricted, the free length of the movable film 204 becomes smaller, and the striking noise due to contacting of the movable film 204 is reduced. Also, as is also clear from the constitution of the engine mount 170, the rubber buffer is not limited to being a band shaped tube. Furthermore, as a specific mode of the cross section area of the connecting part 208 of the movable film 204 being smaller than the cross section area of the main unit part 206, as with this embodiment, it is possible to make only the width dimension of the connecting part 208 smaller than the width dimension of the main unit part 206, or it is also possible to make only the thickness dimension of the connecting part 208 smaller than the thickness dimension of the main unit part 206.

Figure 22:
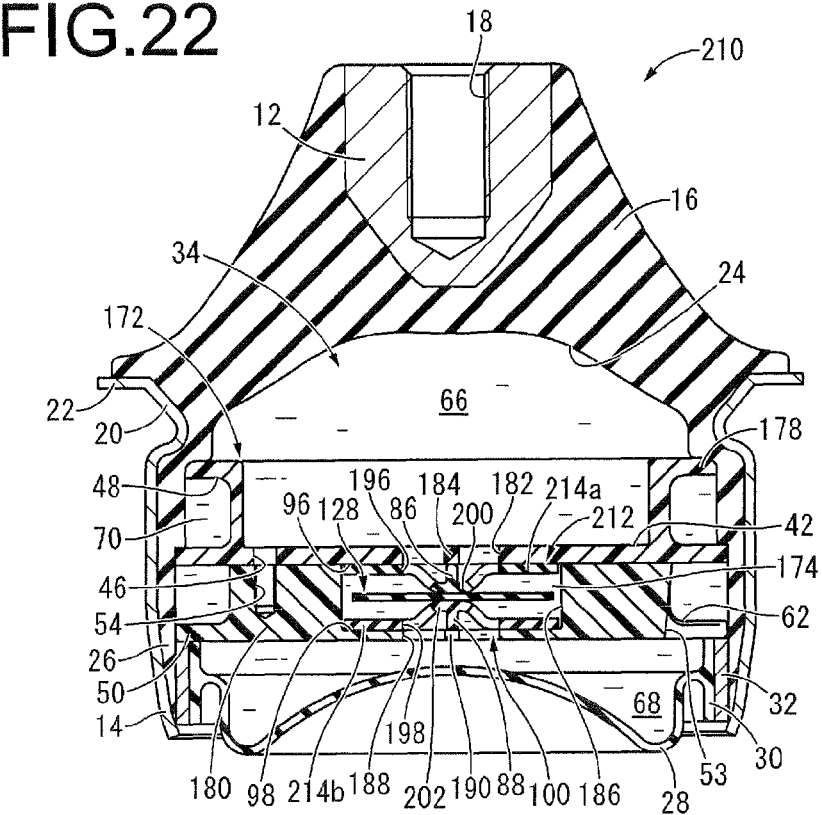
FIG. 22 is a vertical cross section view showing an engine mount as a seventh embodiment of the present invention.

FIG. 22 shows an automobile engine mount 210 as a seventh embodiment of the fluid-filled vibration damping device constituted according to the present invention. The engine mount 210 has a rubber buffer 212 arranged in the housing space 174 of the partition member 172.

The rubber buffer 212 is constituted including mutually independent facing plate portion 214*a* and facing plate portion 214*b*. The facing plate portions 214*a* and 214*b* have mutually roughly the same rectangular plate shape, and two first window portions 196 and 196 are formed on the facing plate portion 214*b*, and two second window portions 198 and 198 are formed on the facing plate portion 214*b*. Furthermore, the upper elastic projection 86 projecting upward at the center part is integrally formed on the facing plate portion 214*a*, and the lower elastic projection 88 projecting downward at the center part is integrally formed on the facing plate portion 214*b*.

Also, the facing plate portion 214*a* is overlapped on the upper wall inner surface 96 of the housing space 174, and the outer circumference part is fixed to the upper partition member 178 by a means such as adhesion, locking or the like, and at the center part, the projecting tip end surface of the upper elastic projection 86 contacts the upper wall inner surface 96. Meanwhile, the facing plate portion 214*b* is overlapped on the lower wall inner surface 98 of the housing space 174, and the outer circumference part is fixed to the lower partition member 180 by a means such as adhesion, locking or the like, and at the center part, the projecting tip end surface of the lower elastic projection 88 contacts the lower wall inner surface 98.

By so doing, the center part of the facing plate portions 214*a* and 214*b* bend and deform so as to have the center part of the facing plate portions 214*a* and 214*b* be convex facing the facing direction inside. With this embodiment, the facing plate portion 214*a* and the facing plate portion 214*b* have mutually symmetrical shapes in relation to the axis-perpendicular plane, and by arranging a single shape rubber elastic body reversed front and back in the housing space 174, the facing plate portion 214*a* and the facing plate portion 214*b* are realized.

Also, the movable plate 128 is arranged between the facing surfaces of the facing plate portions 214*a* and 214*b*. The movable plate 128 is a rubber elastic body having a roughly rectangular flat plate shape, and the center part is grasped in the thickness direction between the upper and lower wall inner surfaces 96 and 98 of the housing space 174 via the facing plate portions 214*a* and 214*b* of the rubber buffer 212. By so doing, the center part is constricted in relation to the relative pressure fluctuations of the pressure-receiving chamber 66 and the equilibrium chamber 68, and the deformation and displacement are restricted, and the outer circumference part allows deformation of the thickness direction.

With this kind of engine mount 210 of this embodiment as well, the striking noise generated by contact of the movable plate 128 on the upper and lower wall inner surfaces 96 and 98 of the housing space 174 is prevented. Also, as is clear from the constitution of the engine mount 210, the rubber buffer is not necessarily limited to being a hollow shape, and also does not have to be integrally formed overall.

Figure 23:
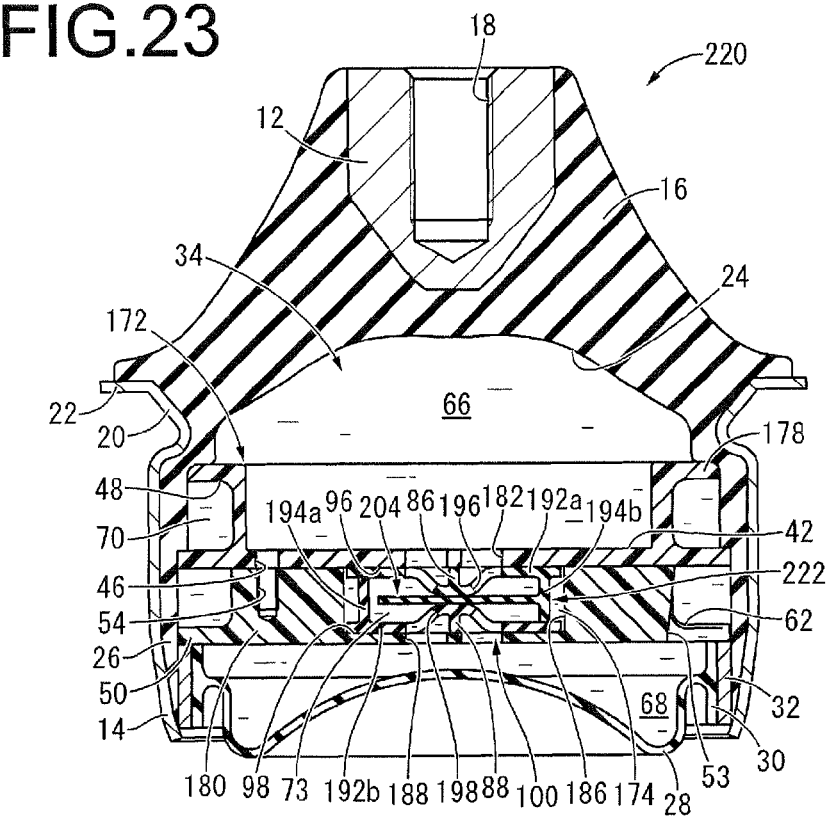
FIG. 23 is a vertical cross section view showing an engine mount as an eighth embodiment of the present invention.

FIG. 23 shows an automobile engine mount 220 as an eighth embodiment of the fluid-filled vibration damping device constituted according to the present invention. The engine mount 220 has a constitution with which rubber buffer 222 is arranged in the housing space 174 of the partition member 172.

Figure 24:
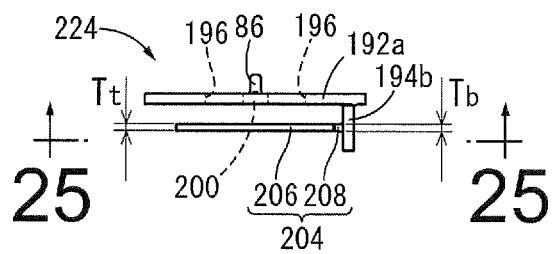
FIG. 24 is a front view of a first buffer body of the engine mount shown in FIG. 23.
Figure 25:
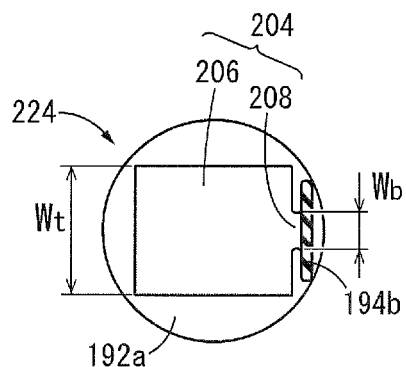
FIG. 25 is a cross section view taken along line 25-25 of FIG. 24.
Figure 26:
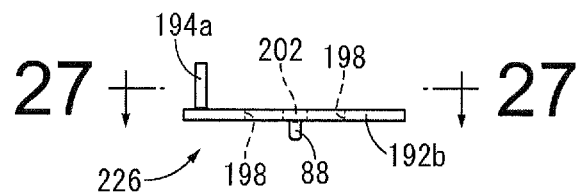
FIG. 26 is a front view of a second buffer body of the engine mount shown in FIG. 23.
Figure 27:
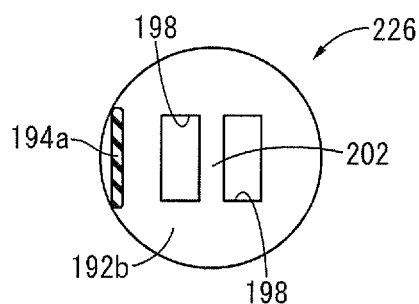
FIG. 27 is a cross section view taken along line 27-27 of FIG. 26.

The rubber buffer 222 is constituted including a first buffer body 224 and a second buffer body 226. As shown in FIG. 24 and FIG. 25, the first buffer body 224 is integrally equipped with the facing plate portion 192*a* and the side plate portion 194*b* as a support part, and is also integrally equipped with the movable film 204 extending out from the side plate portion 194*b*. The movable film 204 has the same shape as the movable film 204 (see FIG. 20 and FIG. 21) of the sixth embodiment, and while the thickness dimension $T_b$ of the connecting part 208 connected to the side plate portion 194*b* is equal to the thickness dimension $T_t$ of the main unit part 206, the width dimension $W_b$ of the connecting part 208 is smaller than the width dimension $W_t$ of the main unit part 206. By so doing, the cross sectional area of the connecting part 208 is smaller than that of the main unit part 206, and the connecting part 208 elastically deforms more easily than the main unit part 206. Meanwhile, the second buffer body 226 is formed as a separate item independently from the first buffer body 224, and as shown in FIG. 26 and FIG. 27, is integrally equipped with the facing plate portion 192*b* and the side plate portion 194*a*.

Also, by the first and second buffer bodies 224 and 226 being arranged in the housing space 174 as shown in FIG. 23, the rubber buffer 222 is constituted. Also, in the state arranged in the housing space 174, the facing plate portion 192*a* of the first buffer body 224 is overlapped on the upper wall inner surface 96 of the pressure-receiving chamber 66 side at the housing space 174 and covers the upper wall inner surface 96, and the facing plate portion 192*b* of the second buffer body 226 overlaps the lower wall inner surface 98 of the equilibrium chamber 68 side at the housing space 174 and covers the lower wall inner surface 98. Furthermore, in the state arranged in the housing space 174, the side plate portion 194b of the first buffer body 224 contacts the facing plate portion 192b of the second buffer body 226, and the side plate portion 194a of the second buffer body 226 contacts the facing plate portion 192a of the first buffer body 224, and the first and second buffer bodies 224 and 226 are arranged in a mutually contacting substantially connected state.

With this kind of engine mount 220 constituted according to this embodiment as well, it is possible to effectively obtain the target striking noise reduction effect. Also, as is also clear from the constitution of this embodiment, with the movable film constitution as well, it is possible to independently form the facing plate portion 192a and the facing plate portion 192b as separate items. In fact, in a state with the facing plate portion 192a and the facing plate portion 192b arranged in the housing space 174, by substantially coupling them via the side plate portions 194a and 194b, the striking noise is further reduced by the energy attenuation action by transmission of vibration energy.

Above, we described embodiments of the present invention in detail, but the present invention is not limited to those specific descriptions. For example, with the embodiments noted above, the upper and lower elastic projections and upper and lower grasping projections are formed at mutually corresponding positions, and are arranged having roughly the same center axis, but the upper and lower elastic projections (grasping projections) can also be formed at mutually different positions. Furthermore, the grasping position of the movable member grasped between the elastic projections or grasping projections is not limited to being the center part of the movable member, and can be set to anything considering the position of the fluid flow path through hole plugged by the movable member (e.g. first window portion 78 and second window portion 80 in the first embodiment noted above) or the position of the opening of the orifice passage or the like. Also, as the mode for grasping the center part of the movable member, as noted with each of the embodiments noted above, it is possible to grasp the center part of the movable member and allow elastic deformation along the entire circumference around the grasped part, and for example also possible to grasp along the entire width of the center part of the movable member, and allow elastic deformation at both sides sandwiching the center part or the like.

Furthermore, the elastic projections and the grasping projections do not necessarily have to be provided at both the upper and lower sides, and for example the elastic projection can be provided at one of the upper or lower side, the grasping projection can be provided at the other of the upper or lower side, or the elastic projection and the grasping projection can be provided at only one of the upper and lower sides. Furthermore, the number, shape, size, and the like of the elastic projections and the grasping projects can be mutually different at both the upper and lower sides.

Also, the rubber buffer is not limited to being a hollow shaped band shaped tube, and for example can also have only one side plate portion provided, can have one side part be divided, and can be constituted to not be able to connect the pair of facing plate portions. Furthermore for example as shown in FIG. 6 and the like, when the movable film is supported via the connecting part, connecting parts can be provided at both sides of the main unit part of the movable film, and both sides of the movable film can be supported and the like.

The present invention is not applicable only to engine mounts, but can also be suitably used for various fluid-filled vibration damping devices including body mounts, member mounts and the like. Also, the application scope of the present invention is not limited to being an automobile fluid-filled vibration damping device, and for example can also be used for fluid-filled vibration damping devices used for other than automobiles, such as for example motorcycles, railroad vehicles, industrial vehicles and the like.

What is claimed is:

1. A fluid-filled vibration damping device comprising:
a first mounting member;
a second mounting member;
a main rubber elastic body elastically connecting the first and second mounting members;
a partition member supported by the second mounting member;
a pressure-receiving chamber whose wall portion is partially defined by the main rubber elastic body and disposed on a first side of the partition member;
an equilibrium chamber whose wall portion is partially defined by a flexible film and disposed on a second side of the partition member;
an orifice passage through which the pressure-receiving chamber and the equilibrium chamber communicate with each other;
a housing space formed within the partition member;
a plate-shaped movable member arranged in the housing space with liquid pressure of the pressure-receiving chamber applied to a first face of the movable member and liquid pressure of the equilibrium chamber applied to a second face of the movable member; and
a rubber buffer arranged on wall inner surfaces of the housing space to be struck by the movable member, wherein
the movable member is grasped partially in a thickness direction between the wall inner surfaces of the housing space via the rubber buffer at surfaces facing the wall inner surfaces of the housing space,
the rubber buffer comprising: (i) a pair of facing plate portions that cover a first wall inner surface on a pressure-receiving chamber side in the housing space and a second wall inner surface on an equilibrium chamber side in the housing space, respectively, and (ii) a pair of side plate portions facing each other, mutually connecting the pair of facing plate portions,
the pair of facing plate portions and the pair of side plate portion are integrally formed so that the rubber buffer has a hollow shape for which the pair of facing plate portions are connected by the pair of side plate portions,
the movable member is housed and arranged in an inner space enclosed by the pair of facing plate portions and the pair of side plate portions, and
the movable member comprises a movable film that is integrally connected to one of the pair of side plate portions, the movable film projecting from the one of the pair of side plate portions to between the pair of facing plate portions.

2. The fluid-filled vibration damping device according to claim 1, wherein
an elastic projection portion is formed projecting from the rubber buffer, and
the movable member is grasped between the wall inner surfaces of the housing space via a formation part of the elastic projection portion on the rubber buffer.

3. The fluid-filled vibration damping device according to claim 2, wherein
the elastic projection portion projects towards an adjacent one of the wall inner surfaces of the housing space, and a projecting tip of the elastic projection portion contacts the adjacent one of the wall inner surfaces of the housing space.

4. The fluid-filled vibration damping device according to claim 1, wherein grasping projection portions projecting toward the rubber buffer are formed on the respective wall inner surfaces of the housing space, and the grasping projection portions contact the rubber buffer so that the movable member is grasped between the grasping projection portions via the rubber buffer.

5. The fluid-filled vibration damping device according to claim 1, wherein a center part of the movable member is grasped between the wall inner surfaces of the housing space via the rubber buffer.

6. The fluid-filled vibration damping device according to claim 1, wherein a connecting part of the movable film that is connected to the one side plate portion elastically deforms with greater ease than a main unit part of the movable film.

7. A fluid-filled vibration damping device comprising:
a first mounting member;
a second mounting. member;
a main rubber elastic body elastically connecting the first and second mounting members;
a partition member supported by the second mounting member;
a pressure-receiving chamber whose wall portion is partially defined by the main rubber elastic body and disposed on a first side of the partition member;
an equilibrium chamber whose wall portion is partially defined by a flexible film and disposed on a second side of the partition member;
an orifice passage through which the pressure-receiving chamber and the equilibrium chamber communicate with each other;
a housing space formed within the partition member;
a plate-shaped movable member arranged in the housing space with liquid pressure of the pressure-receiving chamber applied to a first face of the movable member and liquid pressure of the equilibrium chamber applied to a second face of the movable member; and
a rubber buffer arranged on wall inner surfaces of the housing space to be struck by the movable member, wherein
the movable member is grasped partially in a thickness direction between the wall inner surfaces of the housing space via the rubber buffer at surfaces facing the wall inner surfaces of the housing space,
the rubber buffer has a pair of facing plate portions that cover a first wall inner surface on a pressure-receiving chamber side and a second wall inner surface on an equilibrium chamber side in the housing space,
the facing plate portions are formed independently from each other as separate items,
one of the pair of facing plate portions has a support part projecting toward another of the pair of facing plate portions,
the movable member that extends between facing surfaces of the pair of facing plate portions projects from the support part and comprises a movable film supported by the one of the facing plate portions,
a connecting part of the movable film that is connected to the support part elastically deforms more easily than a main unit part of the movable film, and
the connecting part of the movable film elastically deforms with greater ease than the main unit part by its cross sectional area being made smaller than that of the main unit part of the movable film.

8. The fluid-filled vibration damping device according to claim 7, wherein the connecting part of the movable film elastically deforms with greater ease than the main unit part by at least one of its thickness dimension and its width dimension being made smaller than that of the main unit part of the movable film.

9. A fluid-filled vibration damping device comprising:
a first mounting member;
a second mounting member;
a main rubber elastic body elastically connecting the first and second mounting members;
a partition member supported by the second mounting member;
a pressure-receiving chamber whose wall portion is partially defined by the main rubber elastic body and disposed on a first side of the partition member;
an equilibrium chamber whose wall portion is partially defined by a flexible film and disposed on a second side of the partition member;
an orifice passage through which the pressure-receiving chamber and the equilibrium chamber communicate with each other;
a housing space formed within the partition member;
a plate-shaped movable member arranged in the housing space with liquid pressure of the pressure-receiving chamber applied to a first face of the movable member and liquid pressure of the equilibrium chamber applied to a second face of the movable member; and
a rubber buffer arranged on wall inner surfaces of the housing space to be struck by the movable member, wherein
the movable member is grasped partially in a thickness direction between the wall inner surfaces of the housing space via the rubber buffer at surfaces facing the wall inner surfaces of the housing space, wherein
the rubber buffer has a pair of facing plate portions that cover a first wall inner surface on a pressure-receiving chamber side and a second wall inner surface on an equilibrium chamber side in the housing space, and has at least one side plate portion mutually connecting the pair of facing plate portions,
the pair of facing plate portions and the side plate portion are integrally formed,
the movable member comprises a movable film projecting from the side plate portion to between the pair of facing plate portions,
a connecting part of the movable film that is connected to the side plate portion elastically deforms with greater ease than a main unit part of the movable film, and
the connecting part of the movable film elastically deforms with greater ease than the main unit part by its cross sectional area being made smaller than that of the main unit part of the movable film.

10. The fluid-filled vibration damping device according to claim 9, wherein the connecting part of the movable film elastically deforms with greater ease than the main unit part by at least one of its thickness dimension and its width dimension being made smaller than that of the main unit part of the movable film.

* * * * *